US012786668B2

(12) United States Patent
Vidal et al.

(10) Patent No.: US 12,786,668 B2
(45) Date of Patent: Nov. 3, 2026

(54) APPLICATION FREE TRACKER INTERFACES AND AUTO-TRACKING FOR ASSET TRACKERS

(71) Applicants: Alberto Vidal, Campbell, CA (US); Manu Rao, Campbell, CA (US); Prasad Panchalan, Campbell, CA (US)

(72) Inventors: Alberto Vidal, Campbell, CA (US); Manu Rao, Campbell, CA (US); Prasad Panchalan, Campbell, CA (US)

( * ) Notice: Subject to any disclaimer, the term of this patent is extended or adjusted under 35 U.S.C. 154(b) by 227 days.

(21) Appl. No.: 18/822,238

(22) Filed: Sep. 1, 2024

(65) Prior Publication Data

US 2025/0168597 A1 May 22, 2025

Related U.S. Application Data

(63) Continuation-in-part of application No. 18/675,148, filed on May 28, 2024, which is a continuation-in-part
(Continued)

(51) Int. Cl.
*H04W 4/029* (2018.01)
*G06F 40/30* (2020.01)
*G16Y 40/60* (2020.01)

(52) U.S. Cl.
CPC ............ *H04W 4/029* (2018.02); *G06F 40/30* (2020.01); *G16Y 40/60* (2020.01)

(58) Field of Classification Search
CPC ....... H04W 4/029; H04W 4/38; H04W 4/021; H04W 4/02; H04W 12/104; H04W 12/63; H04W 4/027; H04W 64/00; H04W 4/80; H04W 4/90; H04W 4/35; H04W 4/025; H04W 4/023; H04W 12/12; H04W 8/005; H04W 12/126; H04W 60/04;
(Continued)

(56) References Cited

U.S. PATENT DOCUMENTS

2007/0262861 A1* 11/2007 Anderson .............. G06Q 10/08 455/456.1
2020/0067789 A1* 2/2020 Khuti .................. H04L 41/5009
(Continued)

*Primary Examiner* — Nimesh Patel

(57) ABSTRACT

In one aspect, a system for application-free tracker interfaces and auto-tracking for asset trackers comprising: a plurality of asset trackers, wherein each asset tracker tracks one or more IoT assets and obtains a set of IoT data; one or more communications hubs; a server computing device configured to be in communication with the one or more networks, wherein the server computing device is further configured to implement the following logic: with a underlying tracking system operative in the server computing device, wherein the underlying tracking system manages a goal-seeking large language model (LLM) that is trained to translate a natural language into specific tracker device configurations in order to fulfill set goals, and wherein the LLM receives a user's spoken or written request and: constructs a data display based on a user's spoken or written request, answers a user inquiry in the user's spoken or written request with the underlying tracking system facilitates answering to enhance the user experience, and automatically adjusts an asset tracker setting of the plurality of asset trackers based on the user's spoken or written request.

12 Claims, 9 Drawing Sheets

Related U.S. Application Data of application No. 18/484,350, filed on Oct. 10, 2023, application No. 18/822,238 is a continuation-in-part of application No. 17/182,013, filed on Feb. 22, 2021, and a continuation-in-part of application No. 18/792,560, filed on Aug. 2, 2024, and a continuation of application No. 18/792,564, filed on Aug. 2, 2024.

(60) Provisional application No. 63/414,709, filed on Oct. 10, 2022, provisional application No. 63/525,586, filed on Jul. 7, 2023, provisional application No. 63/535,181, filed on Aug. 29, 2023, provisional application No. 63/537,424, filed on Sep. 8, 2023.

(58) Field of Classification Search

CPC ... H04W 24/02; H04W 16/18; H04W 52/223; H04W 52/225; H04W 52/283; H04W 52/281; H04W 16/22; H04W 24/04; H04W 24/06; H04W 40/22; H04W 4/40; H04W 52/0212; H04W 52/267; H04W 52/46; H04W 72/0473; H04W 52/0248; H04W 52/0235; H04W 64/003; H04W 52/028; G06F 40/30; G16Y 40/60; G06Q 10/0833; G06Q 10/087; G06Q 20/308; G06Q 20/3224; G06Q 10/083; G06Q 10/063114; G06Q 30/0261; G06Q 20/321; G06Q 50/06; G06Q 10/0631; G06Q 10/063; G06Q 10/10; G01S 5/0027; G01S 5/14; G01S 5/0036; G01S 5/10; G01S 5/0284; G01S 11/02; G01S 5/02521; G01S 17/89; G01S 17/86; G01S 19/42; G01S 19/48; G01S 2205/006; G01S 2205/09; G01S 19/252; G01S 19/52; G01S 2205/001; H04L 67/535; H04L 2209/80; H04L 9/0872; H04L 9/3297; H04L 41/06; H04L 63/105; Y02D 30/70; G06N 3/08; G06N 3/0464; G06N 5/04; G06N 3/045; G06N 20/00; G06N 3/042; G06N 3/04; G06N 3/02; G06N 3/0475; G06V 10/82; G06V 10/764; G06V 20/182; H04B 17/382; H04B 17/345; H04B 17/27; H04B 7/00; H04B 7/0617; H04B 17/328

See application file for complete search history.

(56) References Cited

U.S. PATENT DOCUMENTS

| | | | | |
|---|---|---|---|---|
| 2020/0229096 | A1* | 7/2020 | Atefi | H04W 28/02 |
| 2020/0273268 | A1* | 8/2020 | Bhattacharyya | G06Q 10/06315 |
| 2021/0289319 | A1* | 9/2021 | Antony | G06F 8/65 |
| 2023/0368773 | A1* | 11/2023 | Mishra | G06N 3/008 |

* cited by examiner

600

APPLICATION FREE TRACKER INTERFACES AND AUTO-TRACKING FOR ASSET TRACKERS

CLAIM OF PRIORITY

The present application claims priority to and is a continuation in part of U.S. Utility patent application Ser. No. 17/182,013, filed on Feb. 22, 2021, and titled GRAPHENE-BASED CHEMICAL SENSING DEVICE AND SYSTEM. This Utility Application is hereby incorporated by reference in its entirety.

The present application claims priority to and is a continuation in part of U.S. Utility patent application Ser. No. 18/675,148, filed on May 28, 2024, and titled EDGE MACHINE-LEARNING TRAINED DIGITAL SCALE CALIBRATION IN AN INTERNET OF THINGS NETWORK. This Utility application is hereby incorporated by reference in its entirety.

The present Application claims priority to and is a continuation in part of U.S. Utility patent application Ser. No. 18/484,350, filed on Oct. 10, 2023, and titled MANAGING COMMUNICATION WITH AND AMOUNGST MOBILE UNITS. This Utility application is hereby incorporated by reference in its entirety.

U.S. Utility patent application Ser. No. 18/484,350 claims priority to U.S. Provisional Patent Application No. 63/414,709, filed Oct. 10, 2022, entitled "Methods and Apparatus for Location Awareness," which is incorporated by reference herein in its entirety. U.S. Utility patent application Ser. No. 18/484,350 claims priority to U.S. Provisional Patent Application No. 63/525,586, filed Jul. 7, 2023, entitled "Remotely Tethered Sensor System," which is incorporated by reference herein in its entirety. U.S. Utility patent application Ser. No. 18/484,350 claims priority to U.S. Provisional Patent Application No. 63/535,181, filed Aug. 29, 2023, entitled "Methods and Apparatus for Location Awareness," which is incorporated by reference herein in its entirety. U.S. Utility patent application Ser. No. 18/484,350 claims priority to U.S. Provisional Patent Application No. 63/537,424, filed Sep. 8, 2023, entitled "Remotely Tethered Sensor System," which is incorporated by reference herein in its entirety.

The present application claims priority to and is a continuation in part of U.S. Utility patent application Ser. No. 18/792,560, filed on Aug. 2, 2024. This Utility application is hereby incorporated by reference in its entirety.

The present application claims priority to and is a continuation in part of U.S. Utility patent application Ser. No. 18/792,564, filed on Aug. 2, 2024. This Utility application is hereby incorporated by reference in its entirety.

BACKGROUND

Trackers users today rely on proprietary applications running on phones, tablets and computers to provide access to the device information stored in the cloud. Accordingly, the data can only be accessed by the user in the form the user experience designer created providing an inflexible interface.

Additionally, tracking data today is often consumed by users in the form of smart notifications and graphical user interfaces with trends and other real-time data representations, tracking statistics, and charts. This provides a limited value to users and consumers of tracking information since they are centered around the idea that the user will derive useful information from receiving, looking, and analyzing this representation of what is happening in the field. Therefore, improvements to application-free tracker interfaces and/or auto-trackers are desired.

BRIEF SUMMARY OF THE INVENTION

In one aspect, a system for application-free tracker interfaces and auto-tracking for asset trackers comprising: a plurality of asset trackers, wherein each asset tracker tracks one or more IoT assets and obtains a set of IoT data; one or more communications hubs; a base station; one or more communication networks; wherein each asset tracker is configured to be in communication with a base station and one or more of the communications hubs; wherein in the one or more communications hubs are configured to be in communication with one or more of the mobile units, and the one or more network; wherein the base station is configured to be in communication with the plurality of asset trackers; a server computing device configured to be in communication with the one or more networks, wherein the server computing device is further configured to implement the following logic: with a underlying tracking system operative in the server computing device, wherein the underlying tracking system manages a goal-seeking large language model (LLM) that is trained to translate a natural language into specific tracker device configurations in order to fulfill set goals, and wherein the LLM receives a user's spoken or written request and: constructs a data display based on a user's spoken or written request, answers a user inquiry in the user's spoken or written request with the underlying tracking system facilitates answering to enhance the user experience, and automatically adjusts an asset tracker setting of the plurality of asset trackers based on the user's spoken or written request.

Figure 1:
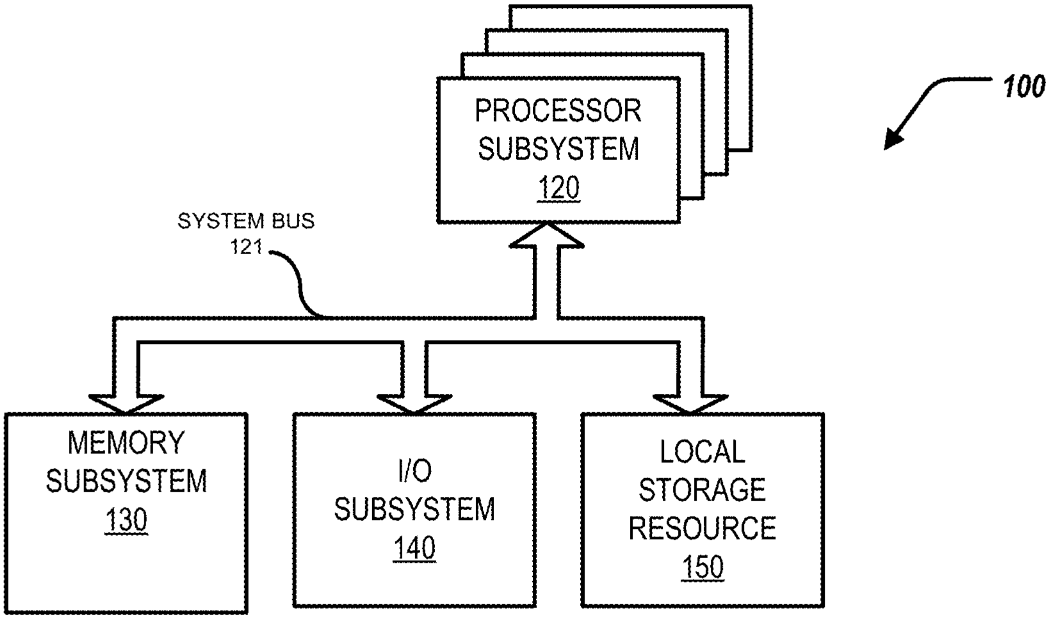
FIG. 1 is a block diagram of selected elements of an embodiment of an information handling system, according to some embodiments.

The Figures described above are a representative set and are not an exhaustive with respect to embodying the invention.

DESCRIPTION

Disclosed are a system, method, and article of manufacture for application free tracker interfaces and auto-tracking for asset trackers. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment, according to some embodiments. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided. These example definitions can be integrated into respective example embodiments discussed infra.

Accelerometer is a device that measures the proper acceleration of an object. Micromachined micro-electromechanical systems (MEMS) accelerometers are used in some examples (e.g. a vibrating structure gyroscope, etc.).

Bluetooth Low Energy (BLE) is a wireless personal area network technology that provides considerably reduced power consumption and cost while maintaining a similar communication range.

Context awareness, Indoor positioning system Location awareness Positioning technologies Track and trace Vehicle tracking system Wireless triangulation, etc.

Edge computing is a distributed computing model that brings computation and data storage closer to the sources of data, so that a user is likely to be physically closer to a server than if all servers were in one place. This can increase the speed of local applications. Edge computing can be any design that pushes computation physically closer to a user, so as to reduce the latency compared to when an application runs on a single data center. Edge computing involves running computer programs that deliver quick responses close to where requests are made. Edge computing might use virtualization technology to simplify deploying and managing various applications on edge servers.

Gyroscope is a device used for measuring or maintaining orientation and angular velocity. In some examples, a microelectromechanical systems (MEMS) gyroscope is a miniaturized gyroscope found in electronic devices (e.g. with the idea of the Foucault pendulum and use a vibrating element, etc.).

Generative artificial intelligence (Generative AI) is artificial intelligence capable of generating text, images, videos, or other data using generative models, often in response to prompts. Generative AI models learn the patterns and structure of their input training data and then generate new data that has similar characteristics.

Internet of things (IoT) describes devices with sensors, processing ability, software and other technologies that connect and exchange data with other devices and systems over the Internet or other communications networks. IoT can include devices that are connected to the internet using edge computing.

Inertial measurement unit (IMU) a device that measures acceleration and rotation, used for example to maneuver modern vehicles including motorcycles, missiles, air- and spacecraft.

Large language model (LLM) is a computational model notable for its ability to achieve general-purpose language generation and other natural language processing tasks such as classification. LLMs use language models to acquire these abilities by learning statistical relationships from vast amounts of text during a computationally intensive self-supervised and semi-supervised training process. LLMs can be used for text generation, a form of generative AI, by taking an input text and repeatedly predicting the next token or word.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Printed circuit board (PCB), also called printed wiring board (PWB), is a medium used to connect or "wire" components to one another in a circuit.

Tracking systems can include a locating system. Tracking systems can be used for the observing of persons or objects on the move and supplying a timely ordered sequence of location data for further processing. Tracking systems can include 'real-time' or 'near real-time' like, inter alia: Global Positioning Systems (GPS), radio frequency (RF) communication, Real-time locating systems (RTLS), other radio-based tracking systems, etc.

Ultra-wideband (UWB) is a radio technology that can use a very low energy level for short-range, high-bandwidth communications over a large portion of the radio spectrum. UWB has traditional applications in non-cooperative radar imaging. Most recent applications target sensor data collection, precise locating, and tracking.

These example definitions can be integrated into example embodiments of the systems and methods discussed herein.

Example Systems and Methods

Embodiments of the invention include methods and systems for real-time location, proximity detection, and alerts for and amongst mobile units through the use of low-power communications protocols. In some embodiments of the invention, a two-way ranging operation (such as IEEE 802.15.4a ultra-wideband (UWB) standard) can be utilized that entails a three or four burst exchange between mobile units-poll, reply, final, and in some examples, confirm. In embodiments, the energy utilized to transmit a burst signal through such protocols is minimized as the transmit power consumption is lower than the reception mode and a brief time duration is maintained for each burst.

Further, this disclosure discusses a receiver-centric media access protocol to achieve higher power conservation and longer battery life. In short, mobile units can transmit the initial poll frames with much lower average power consumption than mobile units will consume in receive mode. Thus, all mobile units may frequently and periodically transmit a broadcast poll message containing the identification of the sending mobile unit. The other mobile units, upon receiving the poll message, may respond with a reply message including the identification of the replying mobile unit. Mobile units may turn their receiver to an on-power state for a small-time window sufficient to ensure a high probability of detecting a poll message, and with a longer periodicity to provide power conservation.

Moreover, as collisions may occur if multiple mobile units wake up at the same time and respond to the same poll message, in embodiments of the invention, the probability of collisions may be reduced due to unsynchronized power saving receiver on-off ratios. In embodiments, a "jitter" can be introduced to the transmission messages so that mobile units may not stay synchronized across multiple periods. In embodiments, collisions may be reduced even further if one mobile unit is closer than the other mobile units due to receiver capture effect and shorter transit delay. Also, if a mobile unit sees a poll message from another mobile unit it has recently responded to, the mobile unit may suppress the reply. This media access protocol can be utilized with larger numbers of mobile units.

In embodiments of the invention, network bridges can compute an angle with respect to a mobile unit with a single transmission from a mobile unit and can use that to determine a "cone of interest" and not respond to mobile units outside of this cone of interest. This can provide a reduction of airtime and improvement of battery life conservation.

Embodiments of this invention include systems for broadcasting, by a transmitter of a low power wireless communications protocol from a first mobile unit, a poll message that includes data indicating an identification (ID) of the first mobile unit; in response to the broadcasting, adjusting, by the first mobile unit, a power state of a receiver of the first mobile unit to an on-power state for a specified amount of time; receiving, by a receiver of a second mobile unit, the poll message; storing, by the second unit, data indicating the poll message of the first mobile unit; in response to receiving the poll message, transmitting, by the second mobile unit and within the specified amount of time, a reply message to the first mobile unit, the reply message including data indicating an identification (ID) of the second mobile unit; detecting, by the receiver of the first mobile unit, the reply message; and storing, by the first mobile unit, data indicating the reply message of the second mobile unit.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, a computing device may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, a computing device may be a consumer electronic device, a network storage device, or another suitable device and may vary in size, shape, performance, functionality, and price. The computing device may include memory, one or more processing resources such as a central processing unit (CPU) or hardware or software control logic. Additional components of the computing device may include one or more storage devices, one or more communications ports for communicating with external devices as well as various input and output (I/O) devices, such as a video display. The computing device may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Turning now to the drawings, FIG. 1 illustrates a block diagram depicting selected elements of a computing device 100 in accordance with some embodiments of the present disclosure. Components of computing device 100 may include, but are not limited to, a processor subsystem 120, which may comprise one or more processors, and system bus 121 that communicatively couples various system components to processor subsystem 120 including, for example, a memory subsystem 130, and I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In computing device 100, I/O subsystem 140 may comprise a system, device, or apparatus generally operable to receive and/or transmit data to/from/within computing device 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid-state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid-state storage media) and may be generally operable to store instructions and/or data.

Figure 2:
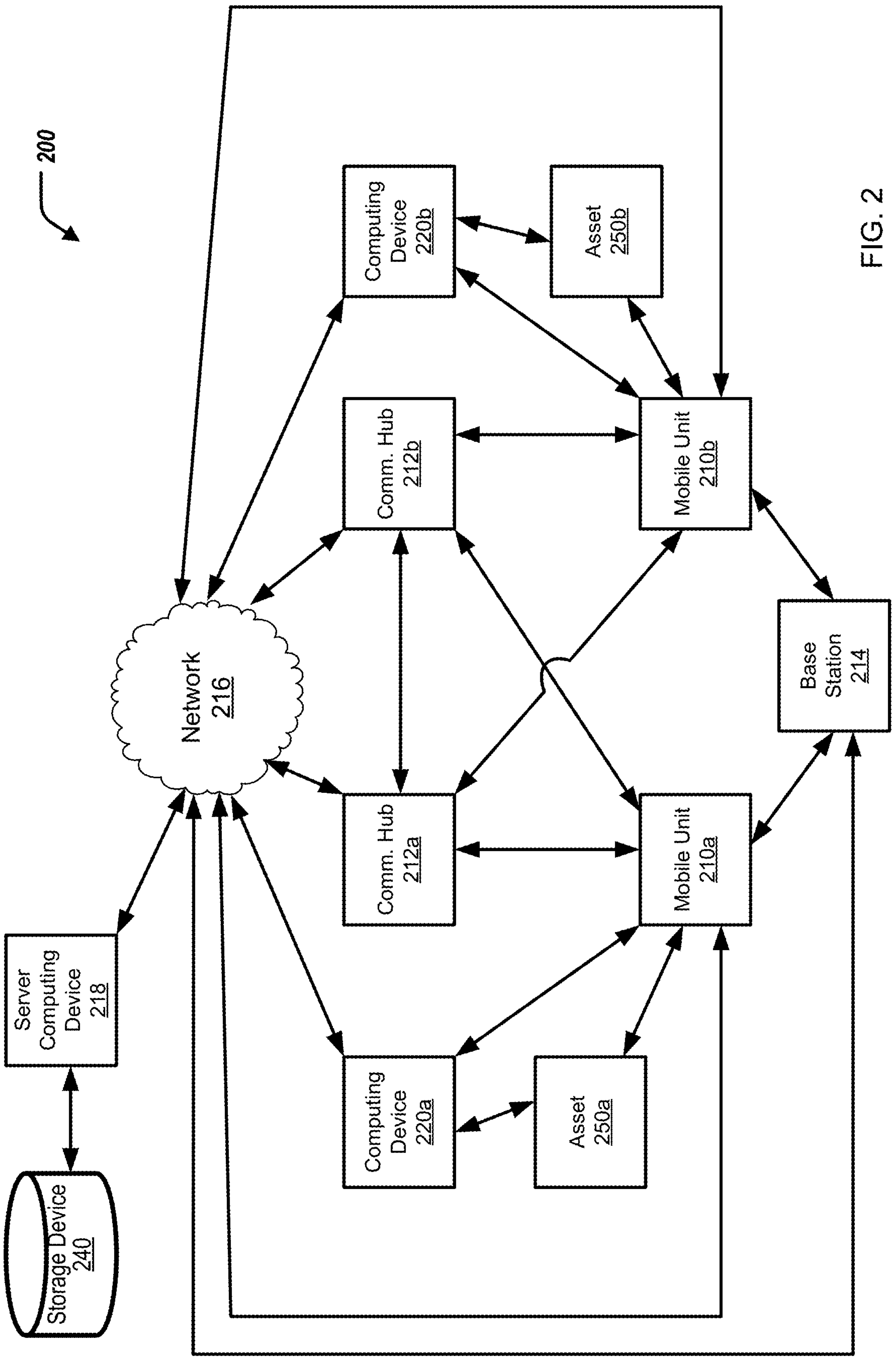
FIG. 2 illustrates a block diagram of a computing environment for managing communication between mobile units, according to some embodiments.

FIG. 2 illustrates a network and computational environment 200 in accordance with certain embodiments of the invention. The environment 200 can include mobile units 210*a*, 210*b* (collectively referred to as mobile units 210); however, the environment 200 can include any number of mobile units 210. The environment 200 can include communications hubs 212*a*, 212*b* (collectively referred to as communications hubs 212); however, the environment 200 can include any number of communications hubs 212. In embodiments of the invention, the environment 200 may include a base station 214; however, the environment 200 can include any number of base stations 214. The environment 200 can include a network 216 (e.g., the cloud, the Internet, or other Wide Area Network (WAN)). The environment 200 can include one or more server computing devices 218. A server computing device 218 may comprise one or more physical servers and/or one or more virtual servers. The environment 200 may include computing devices 220*a*, 220*b* (collectively referred to as computing devices 220). The environment 200 can include a storage device 240.

In some examples, the mobile units 210 are wholly or in part the same, or substantially the same, as the computing device 100 of FIG. 1. That is, the mobile unit 210 can include one or components that are the same, or substantially the same, as that described herein with respect to the computing device 100 of FIG. 1. In some examples, the communications hubs 212 are wholly or in part the same, or substantially the same, as the computing device 100 of FIG. 1. That is, the communications hub 212 can include one or components that are the same, or substantially the same, as that described herein with respect to the computing device 100 of FIG. 1. In some examples, the base station 214 is wholly or in part the same, or substantially the same, as the computing device 100 of FIG. 1. That is, the base station 214 can include one or components that are the same, or substantially the same, as that described herein with respect to the computing device 100 of FIG. 1. In some examples, the server computing device 218 is wholly or in part the same, or substantially the same, as the computing device 100 of FIG. 1. That is, the server computing device 218 can include one or components that are the same, or substantially the same, as that described herein with respect to the computing device 100 of FIG. 1. In some examples, the computing devices 220 are wholly or in part the same, or substantially the same, as the computing device 100 of FIG. 1. That is, the computing devices 220 can include one or components that are the same, or substantially the same, as that described herein with respect to the computing device 100 of FIG. 1.

In some examples, the mobile units 210 can be in communication with the base station 214 and one or more of the communications hubs 212. The communications hubs 212 can be in communication with one or more of the mobile units 210, and the network 216. The communications hub 212*a* can be in communication with the communications hub 212*b*. The base station 214 can be in communication with one or more of the mobile units 210. The server computing device 218 can be in communication with the network 216. The computing device 220*a* can be in communication with the mobile unit 210*a*, and the network 216. The computing device 220*b* can be in communication with the mobile unit 210*b*, and the network 216.

The server computing device 218 can be in communication with the communications hubs 212 and the computing devices 220 over the network 216. The server computing device 218 can be in communication with the storage device 140.

The base station 214 can be in communication with the network 216. The base station 214 can be in communication with the server computing device 218 over the network 216.

In some examples, the mobile units 210 are in direct communication with the network 216. In some examples the mobile units 210 are in communication with the server computing device 218 over the network 216.

In some examples, the computing devices 220 are associated with a respective asset 250. For example, the computing device 220*a* is associated with the asset 250*a*; and the computing device 220*b* is associated with the asset 250*b*. The computing devices 220 can include any type of portable/mobile computing device, such as a smartphone, smart tablet, smart watch, or the similar. The assets 250 can include a person, people, a mammal, an object, or any type of mobile entity that can be associated with the computing devices 220.

In some examples, the mobile units 210 are associated with (or assigned to) a respective asset 250. For example, the mobile unit 210*a* is associated with (or assigned to) the asset 250*a*; and the mobile unit 210*b* is associated with (or assigned to) the asset 250*b*. For example, when the asset 250 includes a person, when the person physically obtains the respective mobile unit 210, the computing device 220 can implement a computer-implemented application to recognize/identify identification data of the respective mobile unit 210 and provide such data to the server computing device 218 over the network 216. The server computing device 218 can store, at the data store 240, data indicating an association between the asset 250 and the respective mobile unit 210. In some examples, the computing device 220 can automatically identify the respective mobile unit 210 (e.g., without user interaction). In some examples, the computing device 220 can execute an image processing application to identify an identification symbol (e.g., QR code) of the respective mobile unit 210.

In some examples, the mobile units 210 are associated with (or assigned to) a respective object (not shown). For example, the object can include a shipping box, a manufactured piece, or similar. For example, a user can physically obtains a mobile unit 210*a*, and physically couple the mobile unit 210 to the object. The computing device 220*a* can implement a computer-implemented application to recognize/identify identification data of the mobile unit 210*a* and provide such data to the server computing device 218 over the network 216. The server computing device 218 can store, at the data store 240, data indicating an association between the object (not shown) and the mobile unit 210*a*. In some examples, the computing device 220 can automatically identify the respective mobile unit 210 (e.g., without user interaction). In some examples, the computing device 220 can execute an image processing application to identify an identification symbol (e.g., QR code) of the respective mobile unit 210.

In short, the environment 200 is a turnkey platform based on wireless ultra-wide band devices and infrastructure, mobile applications, and cloud back end to provide automated and secure location data collection (e.g., of the mobile units 210). The environment 200 is a complete solution for high throughput device distribution location data collection and device charging, described further herein.

Figure 3:
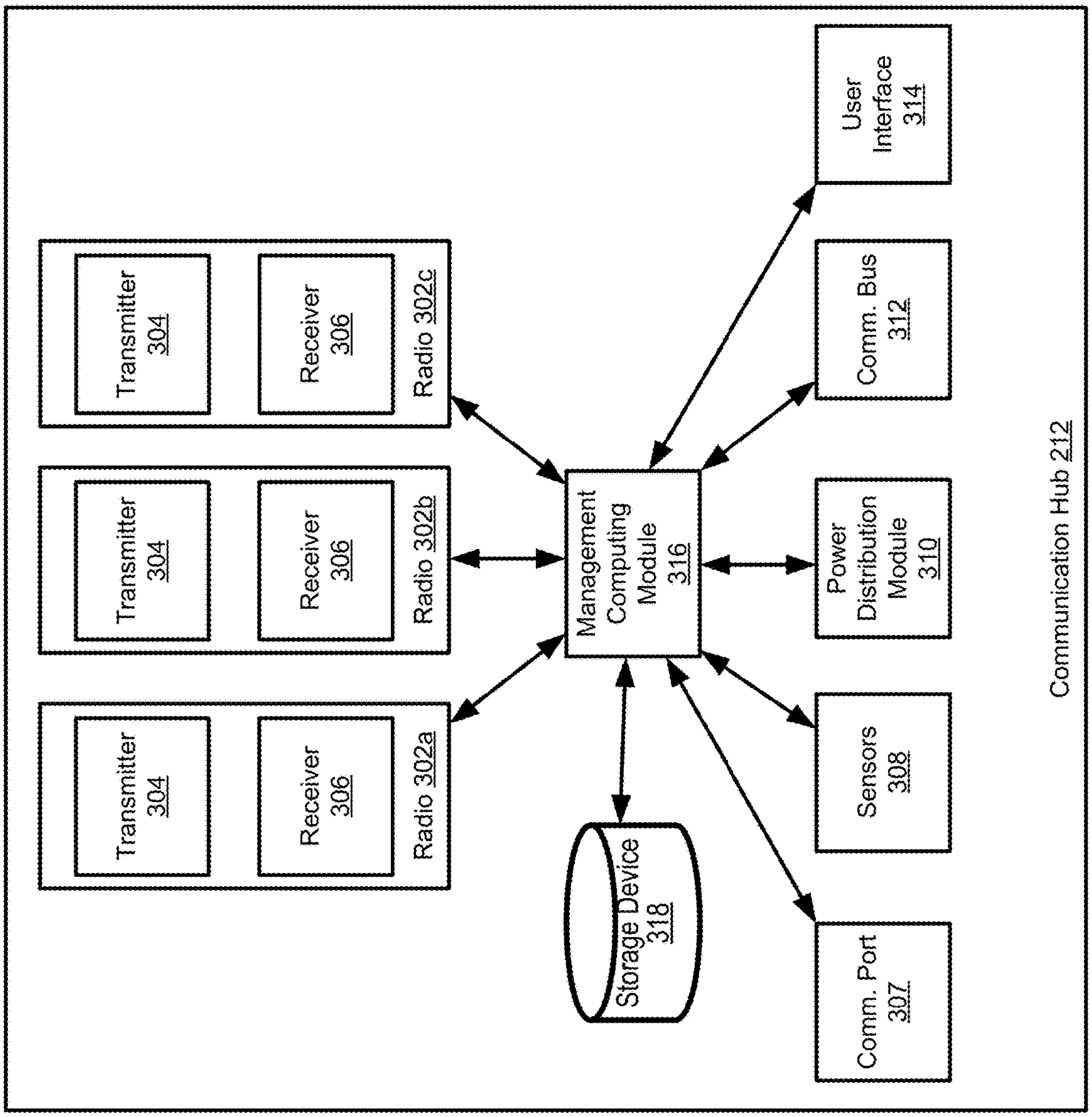
FIG. 3 illustrates a block diagram of a communications hub of the computing environment, according to some embodiments.

FIG. 3 illustrates a block diagram of the communications hub 212. The communications hub 212 can include radios 302, a communications port 307, sensors 308, a power distribution module 310, a communications bus 212, a user interface 314, and a management computing module 316, and a storage device 318. The management computing module 316 can be in communication with the radios 302, the communications port 307, the sensors 308, the power distribution module 310, the communications bus 212, the user interface 314, and the storage device 318. The management computing module 316 can control and manage the radios 302, the communications port 307, the sensors 308, the power distribution module 310, the communications bus 212, the user interface 314, and the storage device 318.

The communications hub 212 can include the radios 302*a*, 302*b*, 302*c* (collectively referred to as radios 302); however, the communications hub 212 can include any number of radios 302. In some examples, the radio 302*a* is a Bluetooth (BT) or Bluetooth Low Energy (BLE) radio. In some examples, the radio 302*b* is an ultra-wideband (UWB) radio. In some examples, the radio 302*c* is a Wireless Fidelity (Wi-Fi) radio. However, the radios 302 can be any type of communication technology such as Long-Term Evolution (LTE), Near-Field Communications (NFC), or similar. Each of the radios 302 can include a respective transmitter 304 and a respective receiver 306.

The communications hub 212 can further include the communications port (e.g., universal serial bus-USB) 307. In some examples, the mobile unit 310 can be physically coupled to the communications hub 212 via the communications port 307 (tethered). In some examples, the communications hub 212 can include multiple communication ports 307. In some examples, an additional communication port is an Ethernet communications port.

The communications hub 212 can further include one or more sensor(s) 308 (global sensors). The sensor(s) 308 can include force, temperature, pressure, humidity, moisture, acoustic, video, infrared (IR), radar, inertial, location, and the like. The communications hub 212 can further include a power distribution module 310 that can detect whether the mobile unit 310 is physically coupled to the communications hub 212 (e.g., via the communications port 307), and/or a power supply is physical coupled to the communications hub 212. The power distribution module 310, when the mobile unit 310 is physically coupled to the anchor unit 212, switches internal connects to power and communicate with the mobile unit 310 (simultaneously). The power distribution module 310, when the power supply is physically coupled to the communications hub 212, charges a power source (e.g., battery or batteries) of the communications hub 212. In some examples, the power supply is permanently coupled to the communications hub 212 (via the port 307 or another port).

The communications hub 212 can include the communication bus (e.g., 12C) 212. In some examples, the communications hub 212 can communicate with the remote sensor 310 (when the remote unit 212 is coupled to the communications hub 212 via the port 307) through the communication bus 212.

The communications hub 212 can include a user interface 314. The user interface 314 can provide feedback and routes received user input to the management computing module 316.

In some examples the communications hub 212 is static. That is, the communications hub 212 is stationary and associated with a particular geophysical location. For example the geophysical location can include a particular location within a warehouse, an office, or the like.

In some examples, the communications hub 212 is an anchor unit, described further herein. In some examples, the communications hub 212 is a bridge, described further herein. In some examples, the communications hub 212 is one of the mobile units 210, described further herein.

Figure 4:
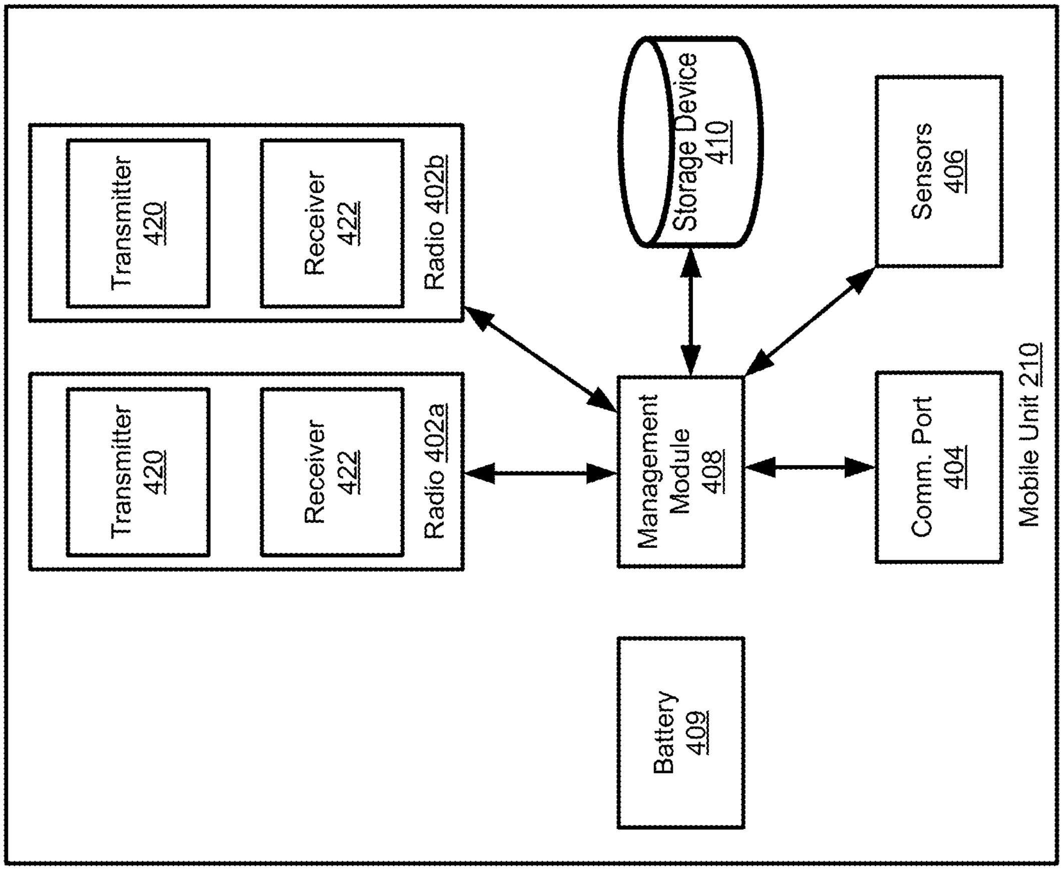
FIG. 4 illustrates a block diagram of a mobile unit of the computing environment, according to some embodiments.

FIG. 4 illustrates a block diagram of the mobile unit 210. The mobile unit 210 can include radios 402, a communications port 404, sensors 406, a management computing module 408, a battery 409, and a storage device 410. The management computing module 408 can be in communication with the radios 402, the communication port 404, the sensors 406, and the storage device 410. The management computing module 408 can control and manage the radios 404, the port 404, the sensors 406, and the storage device 410.

The mobile unit 210 can include the radios 402*a*, 402*b* (collectively referred to as radios 402); however, the mobile unit 210 can include any number of radios 402. In some examples, the radio 402*a* is a Bluetooth (BT) or Bluetooth Low Energy (BLE) radio. In some examples, the radio 402*b* is an ultra-wideband (UWB) radio. However, the radios 402 can be any type of communication technology such as Long-Term Evolution (LTE), Near-Field Communications (NFC), or similar. Each of the radios 402 can include a respective transmitter 420 and a respective receiver 422.

The mobile unit 210 can further include the communications port (e.g., universal serial bus-USB) 404. In some examples, the mobile unit 210 can be physically coupled to the communications hub 212 via the communications port 404 (tethered). In some examples, the mobile unit 210 can include multiple communication ports 404.

The mobile unit 210 can further include one or more sensor(s) 406. The sensor(s) 406 can include force, temperature, pressure, humidity, moisture, acoustic, video, infrared (IR), radar, inertial, location, and the like.

The mobile unit 210 can further include the battery 409. The battery 409 can function to provide power to mobile unit 210 and the components of the mobile unit 210. In some examples, the battery 409 includes one or more primary cells and/or one or more rechargeable secondary cells.

In some examples, the mobile unit 210 can be passively powered. That is, the mobile unit 210 can receive power signals via power waves. In some examples, the communications hub 212 provides the power signals to passively power the mobile unit 210.

Referring to FIGS. 2-4, the environment 200 can facilitate managing communication between the mobile units 210, the communications hubs 212, the base station 214, and/or the server computing device 218 through the use of low-power communications protocols. In short, the environment 200 implements a receiver-centric media access protocol for distance measuring (e.g., between the mobile units 210 or between the mobile units and the communications hubs 212), proximity detection (e.g., between the mobile units 210 or between the mobile units 210 and the communications hubs 212) and providing a warning/notification based on such (e.g., to the computing devices 220). The mobile units 210 and the communications hubs 212 can implement a two-way ranging operation (e.g., IEEE 802.15.4a UWB).

The mobile unit 210*a* can broadcast, at a first time, a poll message that includes data indicating an identification (ID) of the mobile unit 210*a*. For example, the mobile unit 210*a* can broadcast the poll message using either radio 402*a* or radio 402*b*. In some examples, the energy/power required to transmit the poll message (e.g., a UWB burst signal via the radio 402*b*) is relatively small (compared to the reception of the poll message) and the time duration of each burst is short. That is, the mobile unit 210*a* can transmit the initial poll frame with much lower average power consumption than power consumption of reception of the poll message. In some examples, the ID of the mobile unit 210*a* is a BLE address of the mobile unit 210*a*.

In some examples, the mobile unit 210*a* can initially advertise itself using the radio 402*a* (BLE radio) to the mobile unit 210*b* and/or the communications hubs 212; and to detect beacons from the mobile unit 210*b* (that is within range). In some examples, the BLE signaling by the mobile unit 210*a* can additionally provide data indicating UWB communication parameter presets such as RF band, protocol timing parameters, and the like.

The mobile unit 210*a*, in response to broadcasting the poll message, adjusts the power state of the receiver of the radio 402 to an on-power state for a specified amount of time. That is, the mobile unit 210*a*, and in particular, the management module 408, can adjust the power state of the receiver 422 of the radio 402*a* and/or the state of the receiver 422 of the radio 402*b* to an on-power state for a specified amount of time. That is, the power state of the receiver 422 can be turned on to ensure a high probability of a reply message (from the mobile unit 210*b*) to the transmitted poll message, and with a periodicity to provide adequate power conservation.

The mobile unit 210*b* can receive, at a second time after the first time, the poll message. That is, the receiver 422 of the radio 402*a* or the radio 402*b* (based on the communication standard used in transmitting the poll message) can detect/receive the poll message from the mobile unit 210*a*.

The mobile unit 210*b* can store data indicating the poll message at the storage device 410 of the mobile unit 210*b*. That is, the mobile unit 210*b*, and in particular, the management module 408, stores data at the storage device 410 indicating reception of the poll message from the mobile unit 210*a*. The data can further indicate a time at which the poll message was received.

The mobile unit 210*b*, further in response to receiving the poll message, transmits, at a third time after the second time, a reply message to the mobile unit 210*a*. That is, the mobile unit 210*b*, and in particular, the management computing module 408, generates a reply message to the received poll message, and transmits the reply message using the transmitter 420 of the radio 402*a* or the radio 402*b* (depending on the communication standard utilized). In some examples, the mobile unit 210*b* transmits the reply message to the mobile unit 210*a* within the specified amount of time that the receiver 422 of the mobile unit 210*a* is on the on-power state. In some examples, the reply message generated and transmitted by the mobile unit 210*b* includes data indicating an identification (ID) of the mobile unit 210*b*. In some examples the ID of the mobile unit 210*b* is a BLE address of the mobile unit 210*b*.

In some examples, the mobile unit 210*b*, in response to transmitting the reply message, adjusts the power state of the receiver of the radio 402 to an on-power state for a specified amount of time. That is, the mobile unit 210*b*, and in particular, the management computing module 408, can adjust the power state of the receiver 422 of the radio 402*a* and/or the state of the receiver 422 of the radio 402*b* to an on-power state for a specified amount of time. That is, the power state of the receiver 422 can be turned on to ensure a high probability of a further message (from the mobile unit 210*a*) to the transmitted reply message, and with a periodicity to provide adequate power conservation.

The mobile unit 210*a* can detect/receive, at a fourth time after the third time, the reply message of the mobile unit 210*b*. That is, the mobile unit 210*a*, and in particular, the receiver 422, can receive the reply message of the mobile unit 210*b* (the receiver 422 of the radio 402*a* or the radio 402*b* receives the reply message depending on the communication standard utilized to transmit the reply message by the mobile unit 210*b*).

The mobile unit 210*a* can store data indicating the reply message at the storage device 410 of the mobile unit 210*a*. That is, the mobile unit 210*a*, and in particular, the management computing module 408, stores data at the storage device 410 indicating reception of the reply message from the mobile unit 210*b*. The data can further indicate a time at which the reply message was received.

Further, the mobile unit 210*a* can transmit, at a fifth time after the fourth time, a final message to the mobile unit 210*b*. The final message can be in response to the reply message from the mobile unit 210*b*, and specifically, in response to detection of the reply message by the mobile unit 210*a*. For example, the mobile unit 210*a* can broadcast the final message using either the radio 402*a* or the radio 402*b*.

The mobile unit 210*b* can receive, at a sixth time after the fifth time, the final message. That is, the receiver 422 of the radio 402*a* or the radio 402*b* (based on the communication standard used in transmitting the final message) can detect/receive the final message from the mobile unit 210*a*. In some examples, the mobile unit 210*b* can store data indicating the final message at the storage device 410 of the mobile unit 210*b*. That is, the mobile unit 210*b*, and in particular, the management module 408, stores data at the storage device 410 indicating reception of the final message from the mobile unit 210*a*. The data can further indicate a time at which the final message was received.

The mobile unit 210*b*, further in response to receiving the final message, transmits, at a seventh time after the sixth time, a confirmation message to the mobile unit 210*a*. That is, the mobile unit 210*b*, and in particular, the management computing module 408, generates a confirmation message to the received final message, and transmits the confirmation message using the transmitter 420 of the radio 402*a* or the radio 402*b* (depending on the communication standard utilized). In some examples, the mobile unit 210*b* transmits the confirmation message to the mobile unit 210*a* within the specified amount of time that the receiver 422 of the mobile unit 210*a* is in the on-power state.

The mobile unit 210*a* can receive, at an eighth time after the seventh time, the confirmation message. That is, the receiver 422 of the radio 402*a* or the radio 402*b* (based on the communication standard used in transmitting the final message) can detect/receive the confirmation message from the mobile unit 210*b*. In some examples, the mobile unit 210*a* can store data indicating the confirmation message at the storage device 410 of the mobile unit 210*a*. That is, the mobile unit 210*a*, and in particular, the management module 408, stores data at the storage device 410 indicating reception of the confirmation message from the mobile unit 210*b*. The data can further indicate a time at which the final message was received.

In some examples, the mobile unit 210*a*, after storing the data indicating the reply message of the mobile unit 210*b*, adjusts the power state of the receiver 422 of the mobile unit 210*a* to an off-power state. That is, the mobile unit 210*a*, and in particular, the management module 408, can adjust the power state of the receiver 422 of the radio 402*a* and/or the state of the receiver 422 of the radio 402*b* to an off-power state for a specified amount of time (for power conservation). In some examples, the mobile unit 210*a*, after storing the data indicating the confirmation message of the mobile unit 210*b*, adjust the power state of the receiver 422 of the mobile unit 210*a* to an off-power state. That is, the mobile unit 210*a*, and in particular, the management module 408, can adjust the power state of the receiver 422 of the radio 402*a* and/or the state of the receiver 422 of the radio 402*b* to an off-power state for a specified amount of time (for power conservation).

In some examples, the mobile unit 210*b*, after storing the data indicating the poll message of the mobile unit 210*a*, adjusts the power state of the receiver 422 of the mobile unit 210*b* to an off-power state. That is, the mobile unit 210*b*, and in particular, the management module 408, can adjust the power state of the receiver 422 of the radio 402*a* and/or the state of the receiver 422 of the radio 402*b* to an off-power state for a specified amount of time (for power conservation). In some examples, the mobile unit 210*b*, after storing the data indicating the final message of the mobile unit 210*a*, adjust the power state of the receiver 422 of the mobile unit 210*b* to an off-power state. That is, the mobile unit 210*b*, and in particular, the management module 408, can adjust the power state of the receiver 422 of the radio 402*a* and/or the state of the receiver 422 of the radio 402*b* to an off-power state for a specified amount of time (for power conservation).

In some examples, the mobile units 210 are, for a period of time, randomized in terms of operation state. That is, the mobile units 210 are randomized with respect to the states of transmission of data, reception of data, or an idle state. For example, for any of the mobile units 210, the mobile unit 210 can alternative, for the period of time, being in a state of transmission of data (e.g., 37.5% probability); being in state of reception of data (e.g., 12.5% probability); and being in an idle state (e.g., 50% probability). That is, the mobile units 210 can cycle between being in the transmission state, the reception state, or the idle state.

In some examples, only when the mobile unit 210*a* is in the transmission state and the mobile unit 210*b* is in the reception state does the communication cycle described above occur (poll, reply, final, confirm).

In some examples, to minimize, if not prevent, collisions when both mobile units 210*a*, 210*b* broadcast poll messages, a randomized jitter can be introduced at the mobile units 210*a*, 210*b* such that the mobile units are not (inadvertently) time synchronized. Specifically, collisions between the broadcasts of poll messages can occur if both mobile units 210*a*, 210*b* "wake up" at substantially the same time and accordingly provide a reply message to the respective poll messages. Thus, the mobile units 210*a*, 210*b* are not synchronized across multiple time periods. Moreover, collusions of poll messages between the mobile units 210*a*, 210*b* can further be reduced, and/or prevented, when an additional mobile unit 210 is proximate to the mobile units 210*a*, 210*b* by receiver capture effect and shorter transit delay when one of the mobile units 210 is closer to another of the mobile units 210.

In some examples, the mobile units 210 can physically be coupled to the base station 214. When the mobile units 210 are physically coupled to the base station 214, the mobile units 210 can transfer data to the base station 214. Specifically, the mobile units 210 can transfer data to a storage device (not shown) of the base station 214 (e.g., over an interface). In particular, the mobile unit 210*a* can transfer data to the base station indicating the reply message and the confirmation message from the mobile unit 210*b*. Further, the mobile unit 210*b* can transfer data to the base station 214 indicating the poll message and the final message from the mobile unit 210*a*. In some examples, the data provided by the mobile units 210 can include positional data of the mobile units 210 with respect to each other and/or positional data of the mobile units 210 with respect to the communications hubs 212. The base station 214 can upload/transmit the data from the mobile units 210 over the network 216. Specifically, the base station 214 can upload data indicating one or more of the poll message, the reply message, the final message, and the confirmation message to the server computer device 218 over the network 216.

In some examples, the base station 214 can, when the mobile units 210 are physically coupled to the base station 214, charge (e.g., the battery 409), monitor, update firmware, and provision the mobile units 210. Charging and monitoring of the mobile units 210 can facilitate and or enable "smart" charging to optimize the lifespan and efficiency of the battery 409. Moreover, when the mobile units 210 are physically coupled to the base station 214 and are charging, the mobile units 210 can charge even when the mobile units 210 are unpowered.

The base station 214 can further check, and update (without user intervention), if appropriate, the firmware version of each of the mobile units 210 when the mobile units 210 are physically coupled to the base station 214. The base station 214 can further check, and update, if appropriate, the configuration of each of the mobile units 210 when the mobile units 210 are physically coupled to the base station 214. Further, if the base station 214 detects any errors of one or more of the mobile units 210, the base station 214 can indicate, e.g., to the server computing device 218, that the mobile unit 210 needs to be removed from service and sent for repair. Furthermore, when the mobile units 210 are physically connected to the base station 214, the mobile units 210 can be placed in "airplane" mode simultaneously by pressing a physical button on the mobile units 210 or issued a command from an associated computing device.

In some examples, the server computing device 218 can receive data from the base station 214. The server computing device 218 can perform a proximity detection between the mobile units 210 based on the uploaded data from the base station 214. The server computing device 218, based on the proximity detection between the mobile units 210, can provide notifications to the respective computing devices 220 that are associated with the respective mobile units 210. For example, the server computing device 218 can provide a first notification (e.g., over the network 216) to the computing device 220*a* that is also associated with the asset 250*a* that indicates the proximity detection between the mobile unit 210*a* and the mobile unit 210*b*. For example, the computing device 220*a* can include a mobile computing device (e.g., smartphone) and the server computing device 218 can provide a notification that is displayed on a screen of the computing device 220*a* indicating the proximity between the mobile unit 210*a*/the asset 250 and the mobile unit 210*b*/the asset 250*b*. Similarly, for example, the server computing device 218 can provide a second notification (e.g., over the network 216) to the computing device 220*b* that is also associated with the asset 250*b* that indicates the proximity detection between the mobile unit 210*a* and the mobile unit 210*b*. For example, the computing device 220*b* can include a mobile computing device (e.g., smartphone) and the server computing device 218 can provide a notification that is displayed on a screen of the computing device 220*b* indicating the proximity between the mobile unit 210*b*/the asset 250*b* and the mobile unit 210*a*/the asset 250*a*.

In some examples, additionally, one of the communications hubs 212 can receive data indicating the poll message from the mobile unit 212*a* and/or data indicating the reply message from the mobile unit 212*b*. The communications hub 212 can upload to the server computing device 218, over the network 216, the data indicating the poll message from the mobile unit 212*a* and/or the data indicating the reply message from the mobile unit 210*b*. In some examples, the mobile units 210 can also provide to the communications hub 214 the final and confirmation messages that the communications hub 214 additionally uploads to the server computing device 218 over the network 216. In some examples, the data provided by the mobile units 210 can include positional data of the mobile units 210 with respect to each other and/or positional data of the mobile units 210 with respect to the communications hubs 212.

The server computing device 218 can perform, based on the uploaded data, a proximity detection between the mobile units 210. The server computing device 218, based on the proximity detection between the mobile units 210, can provide notifications to the respective computing devices 220 that are associated with the respective mobile units 210. For example, the server computing device 218 can provide a first notification (e.g., over the network 216) to the computing device 220*a* that is also associated with the asset 250*a* that indicates the proximity detection between the mobile unit 210*a* and the mobile unit 210*b*. For example, the computing device 220*a* can include a mobile computing device (e.g., smartphone) and the server computing device 218 can provide a notification that is displayed on a screen of the computing device 220*a* indicating the proximity between the mobile unit 210*a*/the asset 250*a* and the mobile unit 210*b*/the asset 250*b*. Similarly, the server computing device 218 can provide a second notification (e.g., over the network 216) to the computing device 220*b* that is also associated with the asset 250*b* that indicates the proximity detection between the mobile unit 210*a* and the mobile unit 210*b*. For example, the computing device 220*b* can include a mobile computing device (e.g., smartphone) and the server computing device 218 can provide a notification that is displayed on a screen of the computing device 220*b* indicating the proximity between the mobile unit 210*b*/the asset 250*b* and the mobile unit 210*a*/the asset 250*a*.

In some examples, the communications hubs 212 are fixed and provide accurate geophysical localization and a real time permanent connection to the server computing device 218, over the network 216. That is, the communications hubs 212 are associated with a specific-fixed location.

In some examples, the communications hubs 212 can be a mobile unit 210 that is configured as the communications hub 212 by associating the communications hub 212 with a specific geophysical location. In some examples, when a mobile unit 210 serves as the communications hub 212, the communications hub 212 is temporary and the communications hub 212 becomes an ad-hoc location ("beacon").

In some examples, the anchors 212 are bridges. That is, the anchors 212 are continuously powered and transmit positional data of the mobile units 210 directly to the server computing device 218 over the network 216. In some examples, the anchors 212 can transmit the location data directly using cellular technology or indirectly using Wi-Fi or other local area networks. The anchors 212 can also communicate directly with the computing devices 220.

In some examples, the mobile unit 210*b* can broadcast an additional poll message that includes data indicating an identification (ID) of the mobile unit 210*b*. For example, the mobile unit 210*b* can broadcast the poll message using either the radio 402*a* or the radio 402*b*. In some examples, the energy/power required to transmit the additional poll message (e.g., a UWB burst signal via the radio 402*b*) is relatively small (compared to the reception of the poll message) and the time duration of each burst is short. That is, the mobile unit 210*b* can transmit the initial additional poll frame with much lower average power consumption than power consumption of reception of the additional poll message. In some examples the ID of the mobile unit 210*b* is a BLE address of the mobile unit 210*b*. In some examples, the mobile unit 210*b* can initially advertise itself using the radio 402*a* (BLE radio) to the mobile unit 210*a* and/or the communications hubs 212; and to detect beacons from the mobile unit 210*a* (that is within range). In some examples, the BLE signaling by the mobile unit 210*b* can additionally provide data indicating UWB communication parameter presets such as RF band, protocol timing parameters, and the like. In some examples, additionally, one of the communications hubs 212 can receive data indicating the poll message from the mobile unit 212*a* and/or data indicating the additional poll message from the mobile unit 212*b*. The communications hub 212 can upload to the server computing device 218, over the network 216, the data indicating the poll message from the mobile unit 212*a* and/or the data indicating the additional poll message from the mobile unit 210*b*.

In some examples, the mobile units 210 can also provide to the communications hub 212 the reply message, the final message, and the confirmation messages that are additionally uploaded to the server computing device 218 over the network 216. The server computing device 218 can perform, based on the uploaded data, a proximity detection between the mobile units 210. The server computing device 218, based on the proximity detection between the mobile units 210, can provide notifications to the respective computing devices 220 that are associated with the respective mobile units 210. For example, the server computing device 218 can provide a first notification (e.g., over the network 216) to the computing device 220*a* that is also associated with the asset 250*a* that indicates the proximity detection between the mobile unit 210*a* and the mobile unit 210*b*. For example, the computing device 220*a* can include a mobile computing device (e.g., smartphone) and the server computing device 218 can provide a notification that is displayed on a screen of the computing device 220*a* indicating the proximity between the mobile unit 210*a*/the asset 250*a* and the mobile unit 210*b*/the asset 250*b*. Similarly, the server computing device 218 can provide a second notification (e.g., over the network 216) to the computing device 220*b* that is also associated with the asset 250*b* that indicates the proximity detection between the mobile unit 210*a* and the mobile unit 210*b*. For example, the computing device 220*b* can include a mobile computing device (e.g., smartphone) and the server computing device 218 can provide a notification that is displayed on a screen of the computing device 220*b* indicating the proximity between the mobile unit 210*b*/the asset 250*b* and the mobile unit 210*a*/the asset 250*a*.

In some examples, the communications hub 212 determines, based on the data from the mobile units 210, a distance between the communications hub 212 and the mobile unit 210. In some examples, the server computing device 218, based on the data from the mobile units 210, determines the distance between the communications hub 212 and the mobile unit 210. In some examples, the communications hub 212, based on the data from the mobile units 210, determines an angle between the communications hub 212 and the mobile unit 210. In some examples the server computing device 218, based on the data from the mobile units 210, determines the angle between the communications hub 212 and the mobile unit 210.

Specifically, the communications hub 212 and/or the server computing device 218 can determine the angle of the mobile unit 210 with respect to the communications hub 212 with a single communication transmission from the mobile unit 210. In particular, by the communications hub 212 including at least two or more radios 302, the communications hub 212 is able to determine a distance and an angle of the mobile unit 210 with respect to the communications hub 212. In some examples, based on the angle of the mobile unit 210 with respect to the communications hub 212, a "cone of interest" can be identified by the communications hub 212 and/or the server computing device 218. To that end, the communications hub 212 will not respond to poll messages from the mobile unit 210 that are outside of this cone of interest. This provides, at least, reducing on airtime and battery life conservation of the mobile unit 210 and/or the communications hub 212.

Furthermore the communications hubs 212 and/or the server computing device 218 can analyze the uploaded data (positional information of the mobile units 210 with respect to each other and/or the positional data of the mobile units 210 with respect to the communications hub 212) to determine occupancy of a predetermined physical area, transfer area bottlenecks, rates of compliance and specific physical areas, and like.

In some examples, the communications hub 212*a* is associated with a first geophysical location and the communications hub 212*b* is associated with a second geophysical location, with the first geophysical location differing from the second geophysical location. In some examples, however, the first geophysical location can be proximate to the second geophysical location—e.g., a physical space such as an office or warehouse. To that end, a connection can be established between the communications hubs 212. Specifically, a virtual gate or virtual boundary can be established between the communications hubs 212 based on the connection between the communications hubs 212. For example the server computing device 218 can establish the virtual gate/virtual boundary between the communications hubs 212; and/or the communications hubs 212 can establish the virtual gate/virtual boundary therebetween. In some examples the computing devices 220 can facilitate establishing the virtual gate between the communications hub 212.

The communications hubs 212 can receive data indicating the poll message from the mobile unit 212, including positional data of the mobile unit 212 with respect to the communications hubs 212. The communications hubs 212 and/or the server computing device 218 can determine, based on the received positional data of the mobile units 210 with respect to the virtual gate/virtual boundary, that mobile unit 212*a* has intersected the virtual gate/virtual boundary. In response to such, the communications hubs 212 can upload, over the network 216, to the server computing device 218, data indicating that the mobile unit 210*a* has intersected the virtual gate between the communications hubs 212. In some examples, the communications hubs 212 upload to the server computing device 218 additional data such as a direction and a speed of motion of the mobile unit 210. In some examples, the computing devices 220 can facilitate establishing the virtual gate/virtual boundary between the communications hubs 212 (e.g., over the network 216).

In some examples, the communications hubs 212 can filter out communications from a particular mobile unit 210 and only receive communications from a specific mobile unit 210 that is at a precise location. Thus, the communications hubs 212 can communicate directly with the specific mobile unit 210 that is at the precise location. For example, the precise location can be a point of sale, turnstiles, doors, or any other location that might trigger a communication action.

Figure 6:
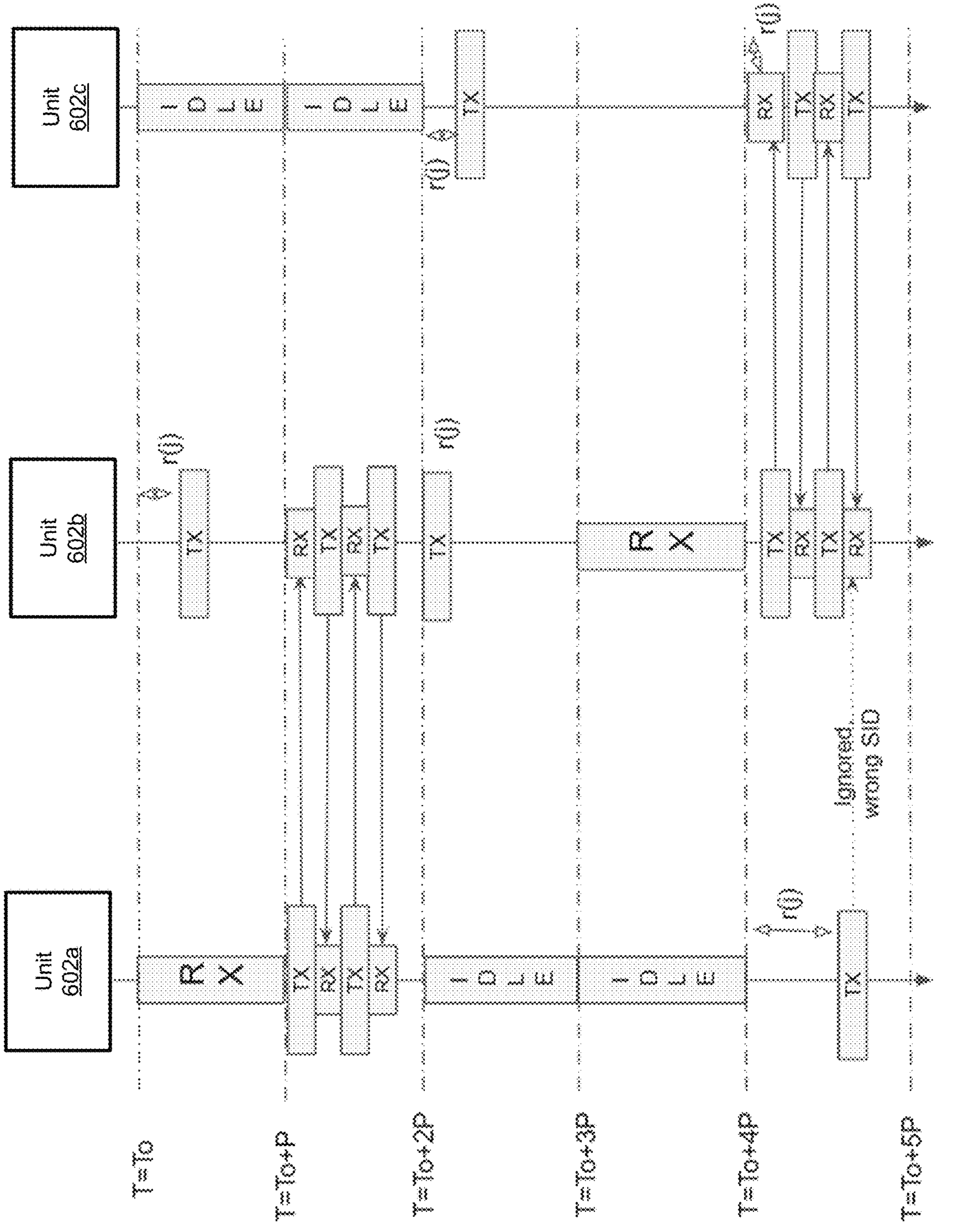
FIG. 6 illustrates a swim-lane diagram of communication between units, according to some embodiments.

FIG. 6 illustrates a swim-lane diagram of an example implementation of the environment 200. Unit 602*a*, 602*b*, 602*c* (collectively referred to as units 602) can represent any of the mobile units 210 and/or the communications hubs 212, and any combination of the mobile units 210 and/or the communications hub 212.

At time T0, the unit 610*a* is in a receive mode, the unit 610*b* is in a transmit mode, and the unit 610*c* is in an idle mode. Note that a random jitter, as described further herein, is introduced for the unit 610*b* in the transmit mode. At time T0+P (e.g., a period of 5 milliseconds), as the unit 610*a* is in the receive mode and the unit 610*b* is in the transmit mode at the time T0, the units 610*a*, 610*b* can perform the communication acts of poll, reply, final, and confirm, as described further herein. That is, the unit 610*a* transmits the poll message that is received by the unit 610*b*; the unit 610*b* transmits the reply message that is received by the unit 610*a*; the unit 610*a* transmits the final message that is received by the unit 610*b*; and the unit 610*b* transmits the confirm message to the unit 610*a*.

After the communication acts at time T0+P, at time T0+2P, the unit 610*a* is idle, the unit 610*b* is in the transmit mode, and the unit 610*c* is in the transmit mode. Note that a random jitter is introduced for the unit 610*c* in the transmit mode. To that end, as both units 610*b*, 610*c* are in the transmit mode and the unit 610*a* is in the idle mode, the communication exchange does not occur for the time T0+2P.

At time T0+3P, the unit 610*a* is in the idle state; the unit 610*b* is in the receive state; and the unit 610*c* is in the transmit state. As a result, at time T0+4P, the units 610*b*, 610*c* can perform the communication acts of poll, reply, final, and confirm, as described further herein. That is, the unit 610*b* transmits the poll message that is received by the unit 610*c*; the unit 610*c* transmits the reply message that is received by the unit 610*b*; the unit 610*b* transmits the final message that is received by the unit 610*c*; and the unit 610*c* transmits the confirm message to the unit 610*b*. Additionally, at time T0+4P, the unit 602*a* is in the transmit mode with the introduced random jitter. Additionally, although the unit 602*a* is in the transmit mode and the unit 602*b* is in the receive mode, the unit 602*b* is already in a communication exchange, and the SID of the unit 602*a* is ignored.

In some examples, the mobile units 210 can be implemented in vehicle tracking such as monitoring routes of the vehicle, fuel consumption of the vehicle, driver behavior, and even facilitate theft prevention and recovery. The mobile units 210 can be implemented in a cargo and supply chain management situation such as monitoring shipments to reduce theft, misplacement, and ensure that the cargo reaches their destination on time. The mobile units 210 can be implemented in tracking personal assets and valuables such as keeping location data of personal valuables like boats, motorcycles, and expensive equipment. The mobile units 210 can be implemented in rental and leasing scenarios such as maintaining the safe and correct usage of equipment, vehicles, and other assets. The mobile units 210 can be implemented in field service management such as monitoring the location of on-field employees and equipment and improving efficiency and coordination.

In some further examples, when the asset 250 includes a user, the environment 200 can be used to notify the user of a possible exposure when entering a facility—e.g., contact tracing. In other words, the environment 200 can be utilized in infection and exposure self-reporting that allows receiving exposure notifications. Specifically, as mentioned herein, the asset (user) 250*a* is associated with the mobile unit 210*a*. The asset (user) 250*a* can associate the mobile unit 210*a* with the computing device 220*a*, for example, using a computer implemented application on the computing device 220*a*. When the asset (user) 250*a* reports an infection or exposure through the application on the computing device 220*a*, the computing device 220*a* can upload such data to the network 216 and the server computing device 218. The server computing device 218 can then access the storage device 240 to identify encounters between the mobile unit 210*a* that is associated with the asset (user) 250*a* and other mobile units 210 that have been indicated as in close proximity or within a proximity threshold to the mobile unit 210*a* of the asset (user) 250*a*—for example, the computing device 220*b* and the asset (user) 250*b*. The server computing device 218 can then provide a notification to the computing device 220*b* over the network 216 that mobile unit 210*b* has been in close proximity to the mobile unit 210*a* and the asset (user) 250*a*.

In some examples, the mobile unit 210*a* can adjust the communication standard utilized by the mobile unit 210*a* based on a previously identified route traversed by the mobile unit 210*a*. Specifically, the management module 408 of the mobile unit 210*a* can adjust utilization of the radios 402 based on the previously identified route transversed by the mobile unit 210*a*. For example, the management module 408 can switch between the radio 402*a* and the radio 402*b* based on such previously identified route. For example, the management module 408 can switch from using UWB to utilizing BLE. In some examples, adjusting the communication standard can include adjusting the frequency at which the mobile unit 210 broadcasts the poll message. The mobile unit 210 can adjust this tracking technology implemented and tracking frequency independently of the communications hub 212 and/or independently of the server computing device 218. In other words, the mobile unit 210 can alter the tracking technology utilized and/or adjust the tracking frequency based on a previously learned behavior of the mobile unit 210 or data from other mobile units 210 that are utilized for the same or similar purpose (e.g., from mobile units 210 that follow similar routes). This can provide battery power usage savings of the mobile unit 210 as the mobile unit 210 can be utilized only when needed to increase tracking definition and/or tracking accuracy.

Specifically, the communications hubs 212 and/or the server computing device 218 can collect tracking information from the mobile units 210 (for example, locations, location sources, location fixed signs, radios used, and the similar). This information is uploaded to the server computing device 218. The server computing device 218 can utilize such information from the mobile units 210 to train a machine learning algorithm utilized to determine when and how often a mobile unit 210 should obtain future tracking points along its route. For example, some routes/locations may necessitate a higher tracking rate and necessitate certain radio technologies as determined by the machine learning algorithm. For example, some routes/locations may necessitate a reduced power demand of the mobile units 210 as determined by the machine learning algorithm.

In some examples, the server computing device 218 can adjust the tracking frequency of the mobile units 210 on-the-fly to minimize and/or prevent intersection of the mobile units 210 with dead signal spots or prevent unnecessary transmission attempts.

In an example, the mobile unit 210 can travel a known route regularly (e.g., every week). Each mobile unit 210 can record its location, location availability, and sensor data. This data is transmitted by the mobile units 210 to the server computing device 218 such that the server computing device 218 can train a machine learning algorithm to predict any possible route issues. In an example, a specific portion of a travel path of the mobile units 210 may not have availability of a specific location technology. Each of the mobile units 210, in response to such, can utilize other available location technologies, thus saving energy and battery usage to activate location technologies that will yield poor location information, reducing wasted energy and extending battery life. In an example, a specific location, where the mobile unit 210 may spend a considerable amount of time, is known to be at a constant temperature. The mobile units 210 can arrive at such locations and reduce their measurement or reporting rate in response to such. The mobile units 210 can further aggregate data for such locations, thereby reducing storage and transmission requirements.

In some examples, the server computing device 218 can train, based on the poll message or other location data of the mobile unit 210*a*, a machine learning algorithm implemented to identify particular tracking point locations of the mobile units 210 along a previously identified route transversed by the mobile unit 210. The server computing device 218 can provide to the mobile unit 210 data indicating the particular tracking point locations. In some examples, these particular tracking point locations can be determined by the machine learning algorithm of the server computing device 218. In response to the data indicating the particular tracking point locations, the mobile units 210 can provide to the server computing device 218 over the network 216, location data of the mobile unit 210 associated with only the particular tracking point locations.

In some examples, multiple mobile units 210 can be in close proximity to one another. Low power radios (e.g., UWB or BLE radios) can be utilized to determine when multiple mobile units 210 are moving together at a close proximity to one another. When such occurs, the mobile units 210 can coordinate with each other such that only one mobile unit 210 communicates with the server computing device 218 (e.g., over the network 216) using higher power radios, to provide power savings. When the mobile units 210 are not within a close proximity to one another, the mobile units 210 can revert to individual tracking, and/or establish new relationships with other mobile units 210.

In an example, several objects are loaded into a truck that is along a route to the airport. The objects will take different routes once at the airport. While the objects travel together in the truck, a single mobile unit 210 can coordinate sending location data to the server computing device 218 over the network 216. The mobile units 210 can communicate with each other to select one of the mobile units 210 ad-hoc based on such criteria as remaining battery life or best connectivity. The remaining mobile units 210 transmit required data using a lower power, closer range wireless technology to the selected mobile unit 210. This selected mobile unit 210 transmits the location data to the server computing device 218 over the network 216 using a more power intensive wireless technology.

In an example, a mobile unit 210 can detect that the life of the battery 409 may prematurely run out of storage capacity due to unpredictable circumstances like loss, or low ambient temperature. The mobile unit 210 can adjust its communication transmission strategy to use short range wireless communications in the presence of other mobile units 210. The mobile device 210 can transmit an alert (e.g., to the computing device 220) to be serviced or replaced, thus reducing the chances of running out of battery life while the mobile unit 210 is in the field. In particular, a mobile unit 210 that needs to send location data can activate a low-rate beaconing mechanism on a low power radio, like BLE. This beacon can include a quality of service/connectivity metric for each communication radio it supports. The other mobile units 210 can listen for these beacons during a period of time. Once a few beacons are received, the mobile unit 210 selects the one with the best quality of service/connectivity for requesting retransmission of its data. A connection can be established by either requesting a connection directly or answering the next beacon within the specified period of time. The first mobile unit 210 to request a connection is serviced—the remaining mobile units 210 may need to wait for the next cycle of availability by listening to subsequent beacons. Once a direct, low power connection is established between the mobile units 210, all the necessary data is transferred from the originating mobile unit 210 to the aggregating mobile unit 210 and this data is immediately forwarded by the aggregating mobile unit 210 to the server computing device 218 over the network 216, or the aggregating mobile unit 210 stores such for later retransmission. Once the data is transferred to the server computing device 218 by the aggregating mobile unit 210, it is indicated in the next beacon so that the originating mobile unit 210 can obtain a confirmation of delivery.

In some examples, the mobile units 210 can be trained (e.g., automatically using machine learning or manually using a computer implemented application) to identify a zone or a region of a physical space by generating a multi-modality fingerprint of the zone or a region (e.g., using Wi-Fi SSIDs or other stationary radio beacons). The mobile unit 210 can utilize such information to determine behavior (e.g., low power mode) without needing to turn on high power radios to communicate with the server computing device 218.

In an example, it can be determined that a mobile unit 210 is in a specific location (e.g., home, office, car, park, shop) using a single radio technology that is prone to errors due to radio wave propagation issues, and lack of defined location boundaries. The machine learning model implemented by the server computing device 218 can be trained to determine a boundary with more certainty based on a sequence of events, location sources, time, and other sensors that utilized sensor and location fusion technology. For example, a user establishes a zone boundary to be "home" to include indoor dwellings, an unfenced front yard, a fenced backyard, and a detached garage. The mobile unit 210 can determine if it is leaving or arriving at a location (e.g., "home", using activity detection such as determining whether a vehicle starting or stopping or arriving by walking or other means). The mobile unit 210 also utilizes Wi-Fi home network detection by remembering and cataloging Wi-Fi networks by time spent near the Wi-Fi networks, proximity to the Wi-Fi networks, connected companion applications, time of day and week in proximity to the Wi-Fi network. The mobile unit 210 can also utilize GPS signals/data to determine the location of the mobile unit 210, as well as use proximity detection to BLE devices (e.g., to determine if the mobile unit 210 is near a vehicle). The mobile unit 210 can further utilize UWB location services to determine a geospatial location of the mobile device 210 and whether the mobile device 210 is within a range of UWB location capable infrastructure routers and ad-hoc UWB systems.

In an extended example, the boundary can move and change with time (e.g., a "safe" boundary). For example the boundary can be associated with a specific person, vehicle, or asset that moves. In this case, the boundary is updated in real-time with data from any combination of sensor fusion location technologies that travel with the specific person, vehicle, or asset. For example, such location technologies can include in-vehicle BLE beaconing systems, a mobile device with BLE or UWB capabilities, tracker and app connected phone GPS location in real time, IMU-based activity tracking, and the like. To that end, maintaining their logical boundary can facilitate system setup and improve usability of a tracking system—improving alarm and notifications that are applicable to end users and machine learning systems.

In some examples, it may be difficult to uncouple any particular mobile unit 210 from another mobile unit 210 that are proximate to one another (e.g., the mobile units 210 are coupled to physical boxes in a warehouse). To that end, a visualization system can overlay digital location data with a real time camera view of a search area (physical area)—provided on a user interface (e.g., of the computing unit 220). This augmented reality (AR) instance can provide quick identification of a specific mobile unit 210. The AR tracking system can be utilized by the computing device 220 (e.g., a smartphone, smartglasses, smartwatch, tablets, and other types of computing devices equipped with Real-Time-Location (RTL) technologies such as Bluetooth, Wi-Fi, UWB, and the like). In some examples the AR tracking system software can provide an AR user interface automatically when an RTL link is within a specified range of the mobile unit 210.

In some examples, the server computing device 218 can request increasing location accuracy of the mobile units 210 (e.g., based on the use of the location data). This translates automatically and in real time to the location radio technology utilized by the mobile units 210 and the server computing device 218. For example, when a general view of all mobile units 210 is to be displayed (e.g., on an user interface) in a large map, the mobile units 210 may only provide the lower power, lowest accuracy location of the mobile units (e.g., LTE tower ID triangulation). When a more accurate visualization of the location data of the mobile units 210 is needed, the server computing device 218 can automatically request a higher accuracy location of the mobile units 210. Thus, enabling the mobile units 210 to switch to a higher power, more accurate location technology (e.g., Wi-Fi SSD geolocate). This process can be transparent and optimized depending on location data usage.

In an example, a warehouse can use mobile units 210 to track the location of assets. Maintenance personnel may need to locate a forklift to service an area. A locating application for the warehouse has been reporting that the forklift is on-site—e.g., every 30 minutes with 1000-meter radius accuracy. This may be enough to make sure the equipment is on-site, but not enough accuracy to locate it quickly. A user can zoom in on a map of the warehouse to see the location of the mobile unit 210 associated with the forklift to see its location with more precision. At this point, the system can switch automatically to a radio that provides higher precision at the expense of power, reporting Wi-Fi geolocation which may be accurate within 50 meters.

Similarly, the system can use motion changes to switch among location technologies. A mobile unit 210 that is moving at high speeds can safely assume that it is outdoors and prioritize GPS. If the mobile unit 210 stops moving for a predetermined amount of time, it can assume it won't stop moving again and take the highest accuracy possible location for all location technologies available at once and stops taking any other location data until motion is detected again. The mobile unit 210 can keep pinging the server computing device 218 to advertise its presence. In an example, the forklift associated with a mobile unit 210 can move in and out of a large warehouse, loading and unloading trucks. It can use motion-based dead reckoning since its motion is fairly limited, until enough error builds up any dead reckoning accuracy drops under a threshold, at which point it is corrected by Wi-Fi geolocate, GPS, UWB positioning, or some other technology that has a higher power cost or that is limited to a specific location. In robotic systems, an autonomous robot could sporadically drive within range of a highly accurate technology, which is not present everywhere in the facility, when their dead reckoning accuracy drops under a threshold to recalibrate it.

In some examples, the sensor 406 of the mobile unit 210 can be an integrated force sensor that can be used to monitor certain conditions (e.g., environmental conditions) of the mobile unit 210 and the battery 409 (such as battery swell due to exposure to heat or battery aging). In particular, the force sensor 406 can monitor any deflection caused by external forces, like a housing of the mobile unit 210 overloading or damage, impacts, falls, and the like, to the mobile unit 210. Any force that translates into an internal mechanical loading can be detected. The forces on the battery 409 or any component of the mobile unit 210 can be measured and analyzed. The sensor 406 can also be used to detect tampering or disassembly attempts.

In an example, the battery 409 can be a lithium polymer battery. When these batteries operate outside of their designated specifications, their internal construction and chemistry reacts producing hydrogen carbon dioxide acids that make the container of the battery 409 swell. The swelling takes place due to a number of factors, like overcharging, over-discharging, age, wear, improper storage, excessive heat, excessive discharge rate, defects and damage, etc. The sensor 406 can be integrated into the mobile unit 210 physically proximate to the battery 409 to detect the mechanical deflection and strain caused by the swelling of the battery 409. As swelling of the battery 409 can happen over a period of time, enough warning can be provided to service the mobile unit 210, disable the mobile unit 210, or charge the battery 409 to prevent further swelling. Multiple sensors 406 can be utilized to determine and characterize the causes of the swelling of the battery 409, like charge and discharge rate, charge and discharge cycles, and operating temperature.

In an example, the force sensor 406 can be utilized to determine the dynamic operating conditions of the mobile unit 210. For example, by measuring the forces applied to the mobile unit 210, area myriad of events can be detected, determined, derived or approximated, like falls, drops, impacts, excessive compression, thermal expansion and contraction, barometric forces, and altitude. Furthermore by profiling these measurements and events against failures and errors, like erratic communications, erratic sensor readings, and others, a detailed service record and service requirements can be predicted before failures occur.

In some examples, multiple force sensors 406 can be distributed under a mattress or a chair. Machine learning algorithms running on the server computing device 218 can utilize data from such sensors to determine occupancy, occupancy transitions, sleeping, discomfort, distress, falling, presence of visitor, presence of staff, and the similar.

In some examples, the computing devices 220 can utilize a browser or general-purpose communication application using a natural language interface to communicate with the mobile units 210. The computing device 220 can utilize such applications to provide an interface to a user for the user to provide a spoken or written request associated with data of the mobile unit 210. In an example, the general-purpose communication application can be based on a goal seeking large language model engine. The general-purpose communication application can leverage artificial intelligence and/or machine learning to provide answers to questions provided by the user via the computing device 220. For example, the user might provide the query "I'm putting this mobile unit 210 in my car. Send me a message to my phone every time it leaves my office." The server computing device 218 can request and report any missing information like the identification number of the mobile unit 210 or the office address and notify the user from that point forward with “your car just left the office.” Such queries can be filtered by the user, such as “notify me only from Monday to Friday” or “Notify me of the maximum and the minimum temperature of the mobile unit 210 for the previous 24 hours before leaving the office.” This system could act on external services, for example “open the door lock and turn on external dock lights when a mobile unit 210 arrives at the docking bay.”

In some examples, the mobile units 210 provide data to the server computing device 218 at preset intervals that the server computing device 218 stores at the storage device 240. The server computing device 218, in response to a query from the user, can access the data of the storage device 240 and apply a machine learning model to it. The machine learning model is created and trained on-the-fly based on the query to provide insight to the user related to their query. In particular, this is achieved by providing the query to an artificial intelligence agent, that in turn seeks the goal of answering the query by breaking the query down into multiple parts or steps and executing them until the goal is reached. Multiple internal and external services and systems to answer the question including specific just-in-time training of the raw tracking data would be utilized. The specific machine learning training methodology and algorithm can be decided at the moment to allow the artificial intelligence agent to answer the question with higher precision or probability. The query can also be run against the data through multiple pre-trained machine learning models to select an answer that best fits the query.

In some examples, the mobile unit 210 can monitor temperature, pressure, vibration, shock, and moisture. The mobile unit 210 can utilize the sensors 406 to detect an alert when hazardous conditions are detected. For example, the sensors 406 can include such sensors as a microphone sensor, water sensor, force sensor, O2 sensor, CO sensor, CO2 sensor, hydrocarbon sensor, benzene sensor, eNose sensor, and the like. These sensors 406 can detect low atmospheric pressure, low oxygen, excess CO2 or CO, water. In an example, the mobile units 210 can be utilized in confined spaces and include sensors such as hydrocarbon, CO, 02 sensors that can detect methane or other hazardous gases in the confined space with finer details. In an example, a microphone detects behavior and environmental events using human audible sound and ultrasound in the mobile unit 210. In an example, an ultra-low power microphone uses graphene membranes to acquire human audible sound and also ultrasound in the mobile units 210.

In some examples, the mobile unit 210 can include a microphone sensor. The integrated microphone sensor can be used to monitor environmental conditions of the mobile unit 210. In particular, the microphone can be “always listening” to monitor events proximate to the mobile unit 210, such as nearby activity, automatic airplane detection, and the like. This data can be utilized and correlated with other data from other sensors (e.g., by the management module 408). In some examples, the mobile unit 210 can include multiple microphones that can be utilized to determine the direction of any sound. In some examples, multiple mobile units 210 you can also cooperate together to triangulate (locate) the source location of a specific sound utilizing the microphones of each mobile unit 210. This can be implemented in coordination with an inertial management unit (IMU) to determine the orientation in space of the mobile unit 210. For example, the mobile unit 210 can utilize the microphone to learn to identify the sound of different vehicles and determine the method of transportation of the mobile unit 210. For example, the mobile unit 210 can utilize the microphone to determine the location of a sound, by coordinating with other nearby mobile units 210 and triangulating the source of the sound using a beamforming microphone setup. For example, tracking timing can be altered in real time based on environmental sensors to decrease update rate conserving battery life. For example, tracking mode could be changed providing more or less precision. For example, environmental noise supplemented with IMU data could raise alerts based on inappropriate readings caused by break in, theft, change in travel modality, and the like for this specific location/stage of a trip of the mobile unit 210. For example, ambient sounds (e.g., by the management module 408) can be processed to further classify the mobile unit 210 environment such as pastoral, indoors, roadway, urban suburban, vehicle, freeway, and the like, assisting in recovery of the mobile unit 210 by matching changes in the soundscape.

In some examples, insurance (protection from loss) can be issued to an asset that is coupled to a mobile unit 210 (such as asset 250). The mobile unit 210 can monitor the proper handling, environmental conditions, location and other parameters necessitated for the insurance to cover the asset. Insurance rates can be determined based on data provided by the mobile unit 210 that relates to these conditions, and locations.

In some examples, the mobile unit 210 can be coupled to an animal (such as a coupled to a collar the animal is wearing). For example, the animal can include livestock. The livestock can be monitored throughout its life to determine the carbon footprint of the livestock and to determine a calculation of carbon footprint cost. This can enable carbon footprint calculations and can be utilized for carbon footprint credit systems tied to direct measurement. The mobile unit 210 can monitor the livestock throughout its life and calculate total energy consumption of the livestock.

In some examples, the mobile unit 210 can be utilized to monitor the well-being of animals and to maintain or validate compliance to regulations and other certifications. For example, livestock can be equipped with the mobile units 210 to determine regulatory compliance to different standards like certified humane, free range, cage free, grass fed, and the like. The mobile unit 210 can be designed to identify grass feeding versus pellet feeding livestock, record, and report it throughout the life of the livestock. Each life stock can be uniquely identified and tracked via its associated mobile unit 210. This can be accomplished by training a set of mobile units 210 to identify different behaviors in livestock, similarly to the application of the mobile units 210 for humans, e.g., running, biking, swimming, sleeping, and the like. For example, the mobile unit 210 can identify behaviors like free roaming, sleeping, eating, planning, crowding, indoor versus outdoor activities, environmental conditions (e.g., weather, rain, temperature, wind, humidity, and the like), and weight rate increases. As a result, unusual behavior could be detected early on, for example, sickness or anxiety of the livestock.

In an example, the sensors 406 can detect small motions for small vibrations. That is, the sensor 406 can detect the reflection from a stationary remote reference object in the environment when the mobile unit 210 is coupled to a physical object.

Figure 5:
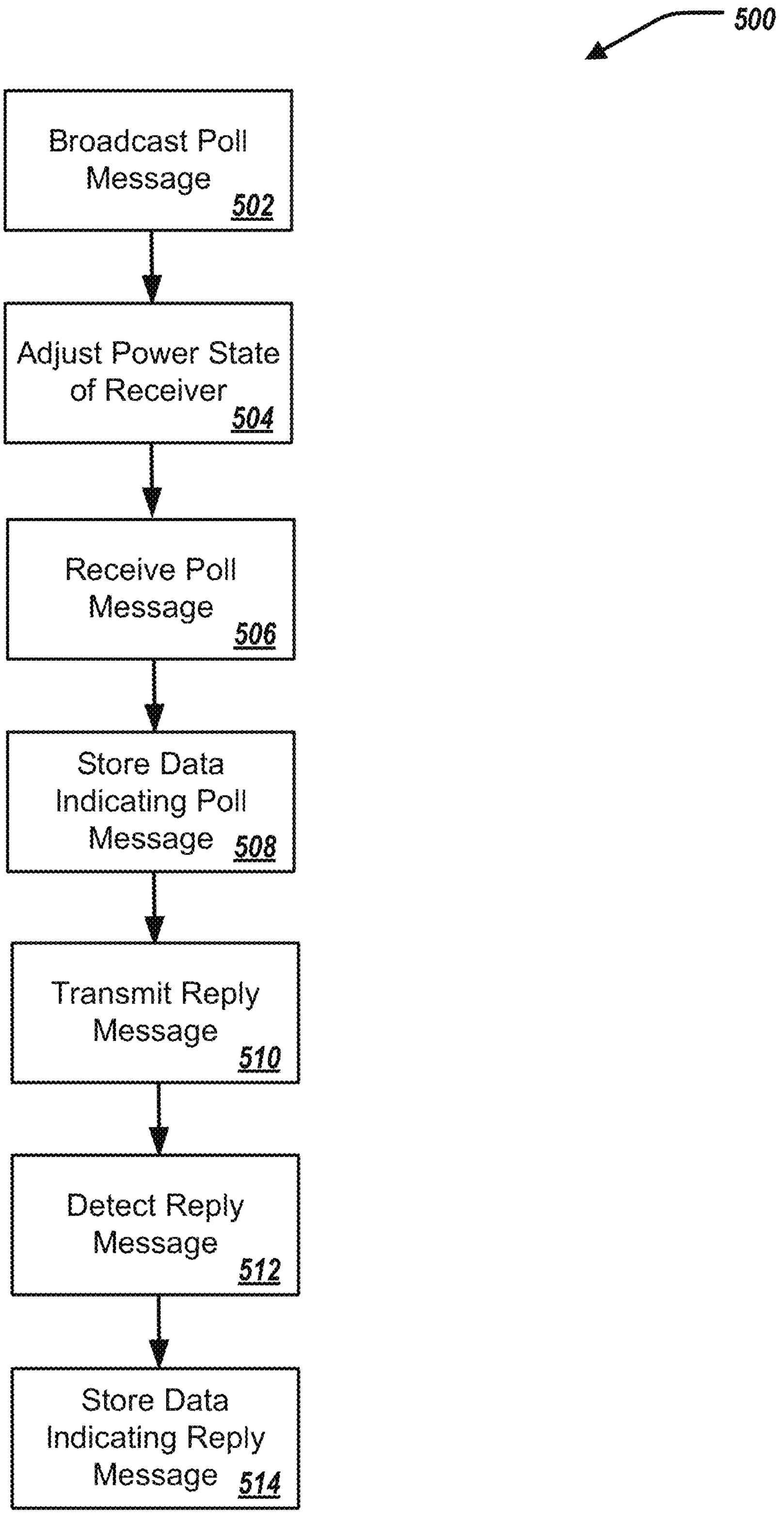
FIG. 5 illustrates a method for managing communication between the mobile units, according to some embodiments.

FIG. 5 illustrates a flowchart depicting selected elements of an embodiment of a method 500 for managing communication between the mobile units 210. The method 500 may be performed by the environment 200, the communications hub 212, and/or the mobile unit 210, and with reference to FIGS. 1-4. It is noted that certain operations described in method 500 may be optional or may be rearranged in different embodiments.

The transmitter 420 of the mobile unit 210*a* broadcasts a poll message that includes the identification (ID) of the mobile unit 210*a*, at 502. The mobile unit 410*a*, in response to the broadcasting, adjusts a power state of the receiver 422 of the mobile unit 210*a* into an on-power state for a specified amount of time, at 504. The receiver 422 of the mobile unit 210*b* receives the poll message, at 506. The mobile unit 210*b* stores data indicating the poll message of the mobile unit 210*a*, at 508. The mobile unit 210*b*, in response to receiving the poll message and within the specified amount of time, transmits a reply message to the mobile unit 210*a* that includes data indicating an identification of the mobile unit 210*b*, at 510. The receiver 422 of the mobile unit 210*a* detects the reply message, at 512. The mobile unit 210*a* stores the data indicating the reply message of the mobile unit 210*b*, at 514.

Application Free Tracker Interfaces and Auto-Tracking for Asset Trackers

Figure 7:
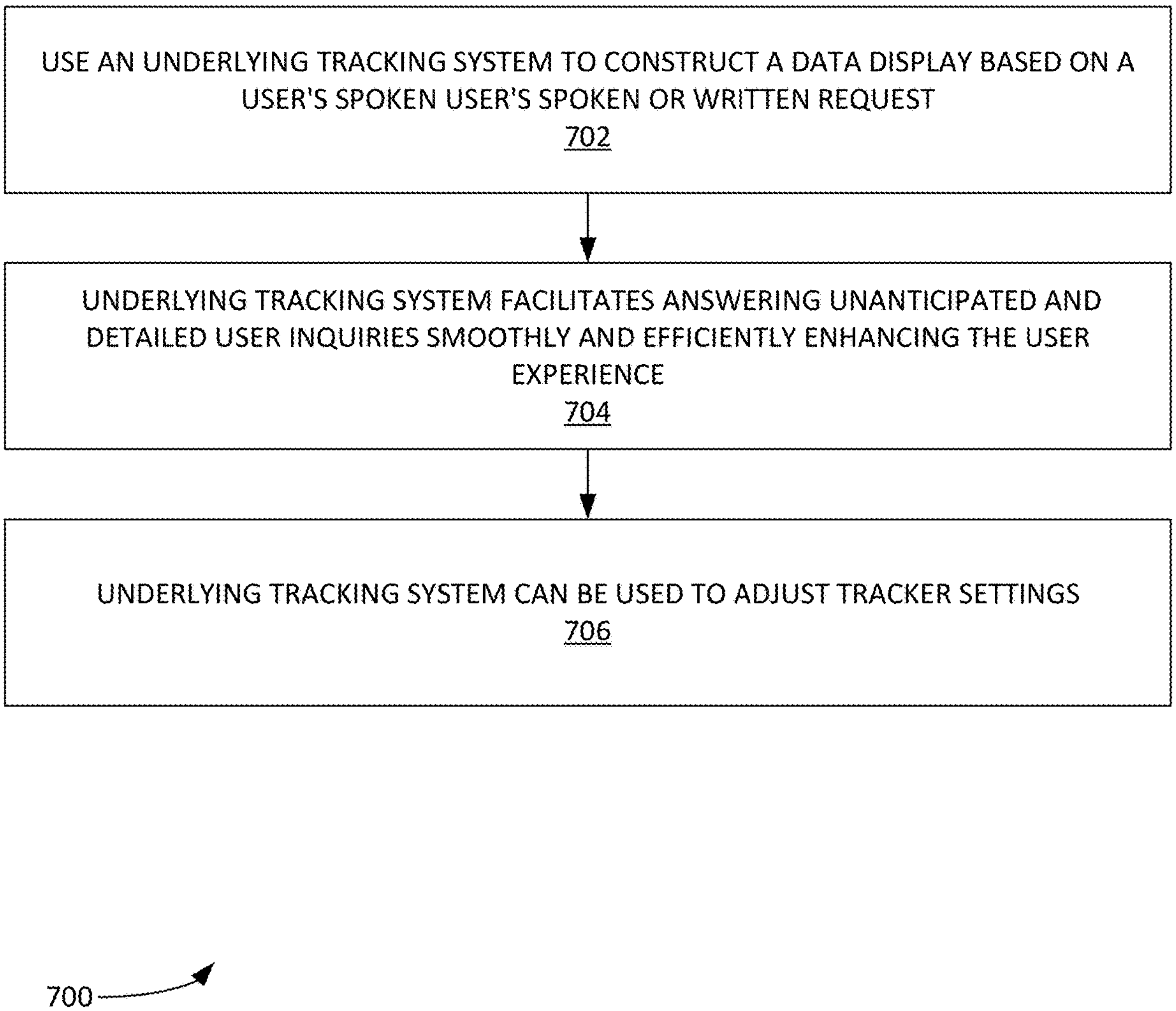
FIG. 7 illustrates an example process for application-free tracker interfaces and auto-tracking for asset trackers, according to some embodiments.

FIG. 7 illustrates an example process for application-free tracker interfaces and auto-tracking for asset trackers, according to some embodiments. Process 700 can replace the rigid interfaces and proprietary applications that use a browser and/or general-purpose communication application (e.g. WhatsApp, Signal, etc.) using a natural language interface. In step 702, process 700 can use an underlying tracking system to construct a data display based on a user's spoken or written request. The underlying tracking system facilitates answering unanticipated and detailed user inquiries smoothly and efficiently enhancing the user experience in step 704. In step 706, the underlying tracking system can be used to adjust asset tracker settings.

Figure 8:
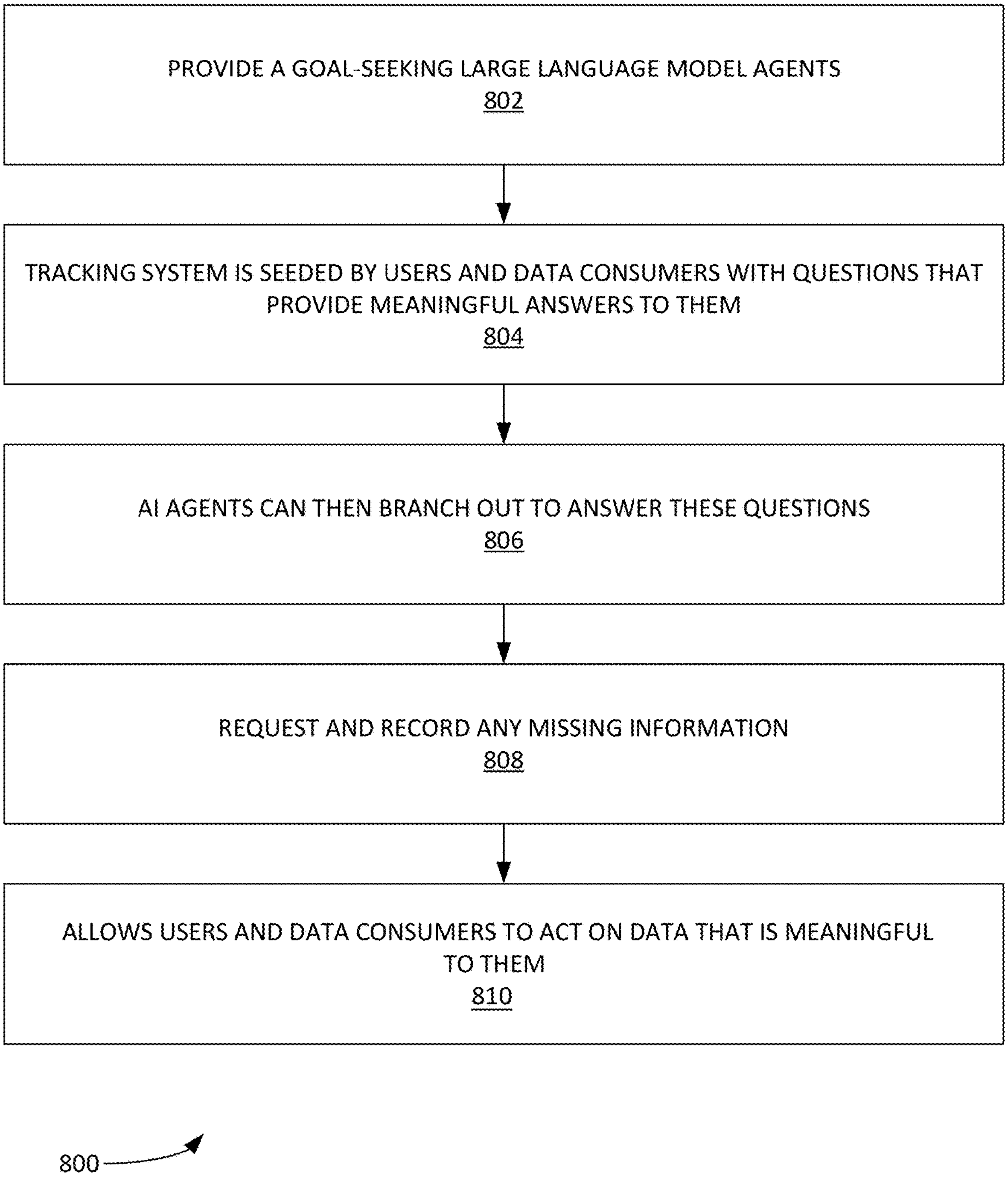
FIG. 8 illustrates an example process for implementing an auto-tracker, according to some embodiments.

FIG. 8 illustrates an example process 800 for implementing an auto-tracker, according to some embodiments. Process 800 can provide better insights and information using an auto-tracker. In step 802, process 800 can provides and/or interfaces with a goal-seeking large language model agent (s). In step 804, a tracking system can be seeded by users and data consumers with questions that provide meaningful answers to them.

In step 806, the AI agents can then branch out to answer these questions. For example: a user might tell the system "I am putting this tracker in my car. Send me a message to my phone every time it leaves my office". In step 808, process 800 can request and record any missing information. For example, the tracker's number or the office address if and notify the user from that point forward with "Your car just left the office". The tracker system can be adjusted easily, for example by filtering "Notify me only from Monday to Friday", or "Notify me for any other tracker that leaves the office", or "Also send me the max and min temperature of the tracker for the previous 24 hours before leaving the office".

Also, the system could act on external services, like for example "open the dock door and turn on external dock lights when a tracker arrives at the docking bay". Process 800 can allows users and data consumers to act on data that is meaningful to them in a way not possible before in step 810.

A custom LLM can be specifically trained to translate natural language into specific tracker device configurations, in order to fulfill set goals. In this manner, on-board tracker sensors or location technologies can be turned on, turned off, change acquisition rates, etc., saving data transmission charges and saving battery power. A configuration agent can be implemented locally (integrated in each tracking device) or globally (as part of a Cloud service).

A goal seeking agent can communicate differently with specific configuration agents to achieve set goals. For example it can request different configurations depending on current location or geographical heading. For example, a goal seeking agent can request all trackers entering an airport to turn off any communication that might interfere with critical airport infrastructure and rely on other sensors until the trackers leave the airport. For example, a goal seeking agent can request that any tracker that travels along other trackers relays data to Cloud using the tracker with better battery life, or that is closest to its destination, or that has better long range connectivity. Local trackers organize themselves using short range communications to then transfer information through one of them, saving considerable resources.

Figure 9:
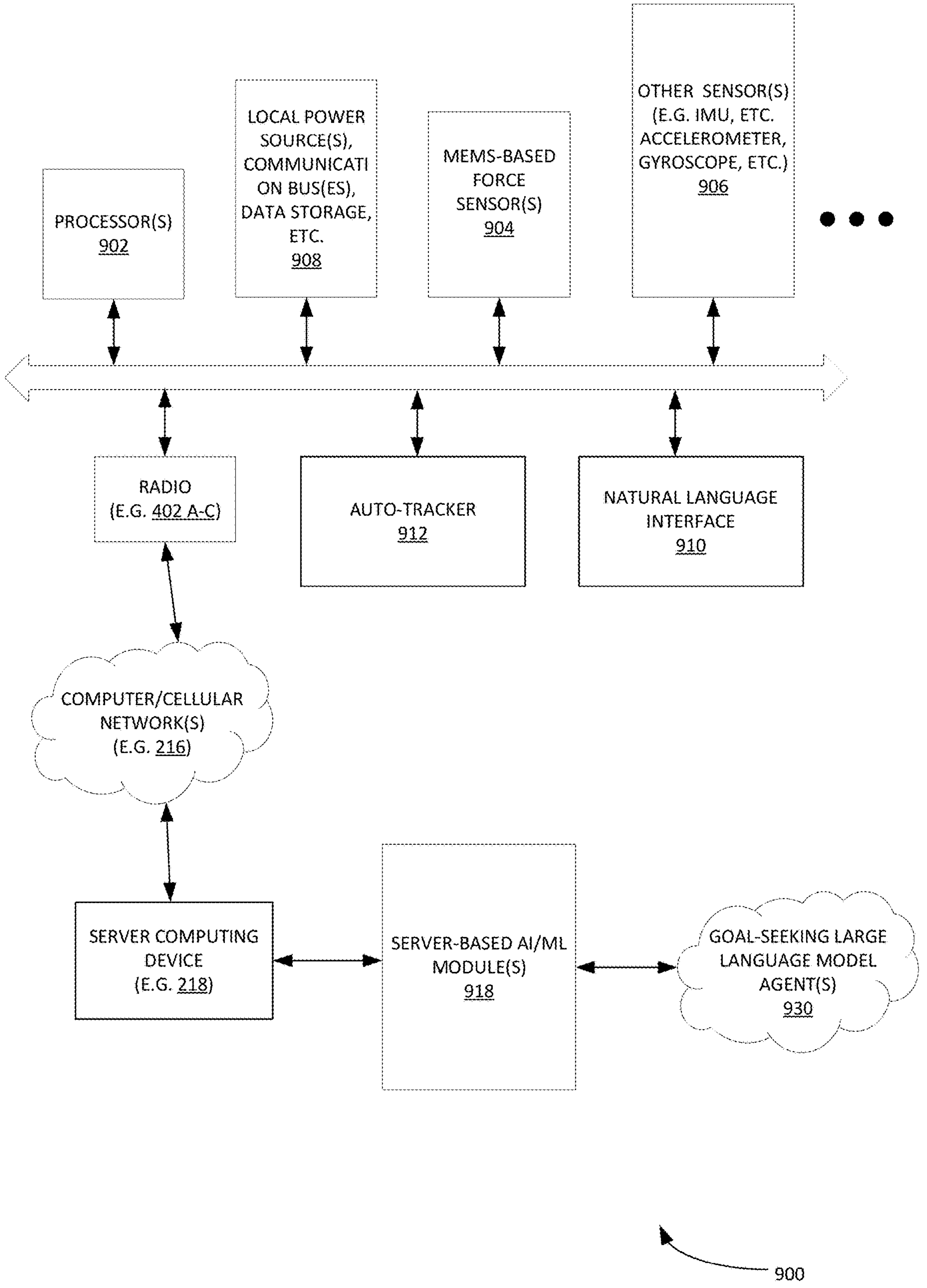
FIG. 9 illustrates an example system for implementing application free tracker interfaces and auto-tracking for asset trackers, according to some embodiments.

FIG. 9 illustrates an example system 900 for implementing application free tracker interfaces and auto-tracking for asset trackers, according to some embodiments. In some example embodiments, system 900 can be integrated with the methods and systems of FIGS. 1-8.

System 900 can include an integrated force sensor (e.g. MEMS-based force sensors 904, etc.) integrated into a PCP board. The integrated force sensor measures mechanical strain.

Processor(s) 902 can include various computing systems. These can be electrical components (e.g. digital circuits) that perform operations (e.g. the methods discussed herein such as processes 700-1100, etc.) on an external data source such as a local memory and/or another data stream. Processor(s) 902 can include a microprocessor implemented on one or more tightly integrated metal-oxide-semiconductor integrated circuit chips. The logic of edge-based AI/ML module (s) 910 can be implemented with processor(s) 902. It is noted that system 900 can include various relevant sensor drivers, power source managers, networking drivers, etc. that are not shown for brevity.

Other sensor(s) (e.g. IMU, accelerometer, gyroscope, temperature sensors, ambient environment sensors, noise sensors, etc.) 906 can be used to measure various values of system 900. Data from other sensors 906 can be used to optimize the outputs of edge ML-system 916.

Radio (e.g. radio(s) 402 *a-c*) can include, inter alia: Bluetooth (BT) or Bluetooth Low Energy (BLE) radio. In some examples, the radio 402 *a-c* is an ultra-wideband (UWB) radio. Radios 402 can be any type of communication technology such as Long-Term Evolution (LTE), Near-Field Communications (NFC), or similar. Each radio 402 can include a respective transmitter and a respective receiver as well. Data from these systems can be used to as input into ML asset tracker location models.

Local power source(s), communication bus(es), data storage, etc. 908 can include battery systems and/or other power sources. Local power source(s) can includes one or more primary cells and/or one or more rechargeable secondary cells. Communication buses can be, inter alia: a memory bus, a peripheral bus, or a local bus using various bus architectures.

Natural language interface 910 can include an tracking system. Natural language interface 910 can construct a data display based on a user's spoken user's spoken and/or written request. The underlying tracking system facilitates answering unanticipated and detailed user inquiries smoothly and efficiently enhancing the user experience.

Natural language interface 910 use its underlying tracking system to adjust asset tracker settings.

Auto-tracker 912 can provide insights and information of tracked systems (e.g. asset trackers, etc.). Auto-tracker 912 provides and/or interfaces with a goal-seeking large language model agent(s) (e.g. goal-seeking large language model agent(s) 1230, etc.). Auto-tracker 912 can be seeded by users and data consumers with questions that provide meaningful answers to them. Auto-tracker 912 can the AI agents that branch out to answer questions provided by users.

Server computing device (e.g. 218) can one or more physical servers and/or one or more virtual servers. These can be used to offload various functionalities of system 700. More specifically, AI/ML processes can be offloaded to a remote AI/ML system (e.g. server-based AI/ML module(s) 918 managed by server ML-system 926. It is noted that can obtain data from a plurality of IoT system (e.g. a plurality of systems like system 900) and store this data in server data training sets 922 and server validation training sets 924. The ML models generated by edge-based AI/ML module(s) 910 can also be included in server data training sets 922 and server validation training sets 924. The ML models of a plurality of edge-based AI/ML module(s) can be uploaded on a periodic basis to server data training sets 922 and server validation training sets 924. In this way, local ML models of a plurality of edge-based AI/ML module(s) can be further optimized and/or checked for accuracy.

In some embodiments, system 900 can utilize one or more machine learning scales as a type of sensor(s) incorporated into a network of location aware sensors. For example, the network of location aware sensors can be a part of an IoT network. System 900 can be used to implement various process such as those of FIGS. 7-8.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

The invention claimed is:

1. A system for application-free tracker interfaces and auto-tracking for asset trackers comprising:

a plurality of asset trackers, wherein each asset tracker tracks one or more IoT assets and obtains a set of IoT data;

one or more communications hubs;

a base station;

one or more communication networks;

wherein each asset tracker is configured to be in communication with a base station and one or more of the communications hubs;

wherein in the one or more communications hubs are configured to be in communication with one or more of the mobile units, and the one or more network;

wherein the base station is configured to be in communication with the plurality of asset trackers;

a server computing device configured to be in communication with the one or more networks, wherein the server computing device is further configured to implement the following logic:

with a underlying tracking system operative in the server computing device, wherein the underlying tracking system manages a goal-seeking large language model (LLM) that is trained to translate a natural language into specific tracker device configurations in order to fulfill set goals, and wherein the LLM receives a user's spoken or written request and:

constructs a data display based on a user's spoken or written request, answers a user inquiry in the user's spoken or written request with the underlying tracking system facilitates answering to enhance the user experience, and automatically adjusts an asset tracker setting of the plurality of asset trackers based on the user's spoken or written request.

2. The computerized system of claim 1, wherein the server computing device is implemented in a cloud-computing platform.

3. The computerized system of claim 1, wherein the goal-seeking LLM is pre-trained with a historical set of asset tracker data.

4. The computerized system of claim 3, wherein the goal-seeking LLM is seeded with a historical set of users and data consumers questions and relevant answers.

5. The computerized system of claim 4, wherein the goal-seeking LLM is configured to implement an auto tracker functionality.

6. The computerized system of claim 5, wherein the auto tracker functionality provides improves insights and information to user queries.

7. The computerized system of claim 6, wherein the auto tracker is configured to:

interface with a plurality of goal-seeking LLM agents, wherein each goal-seeking LLM is seeded with a specified set of user queries and meaning answers.

8. The computerized system of claim 7, wherein the auto tracker is configured to:

receive a user query and then branch out among the plurality of goal-seeking LLM agents to obtain one or more answers to the user query.

9. The computerized system of claim 8, wherein the auto tracker interfaces with a master goal-seeking LLM that is pre-trained to select an optimum answer to the user query.

10. The computerized system of claim 9, wherein the master goal-seeking LLM is pre-trained specifically on the user's historical asset tracker data.

11. The computerized system of claim 10, wherein the master goal-seeking LLM detects missing information in the optimum answer.

12. The computerized system of claim 11, wherein the master goal-seeking LLM automatically fills in the missing information into the optimum answer based on the user's historical asset tracker data.

* * * * *